United States Patent
Biswas et al.

(10) Patent No.: US 10,019,558 B2
(45) Date of Patent: Jul. 10, 2018

(54) CONTROLLING LICENSABLE FEATURES OF SOFTWARE USING ACCESS TOKENS

(71) Applicant: Adobe Systems Incorporated, San Jose, CA (US)

(72) Inventors: Sanjeev Kumar Biswas, Bangalore (IN); John Trammel, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 146 days.

(21) Appl. No.: 15/157,617

(22) Filed: May 18, 2016

(65) Prior Publication Data

US 2017/0337355 A1   Nov. 23, 2017

(51) Int. Cl.
  *G06F 21/10*   (2013.01)
  *H04L 29/06*   (2006.01)
  *G06F 21/62*   (2013.01)

(52) U.S. Cl.
  CPC .......... *G06F 21/105* (2013.01); *G06F 21/62* (2013.01); *G06F 21/6209* (2013.01); *H04L 63/08* (2013.01); *H04L 63/102* (2013.01); *H04L 67/42* (2013.01); *H04L 2209/603* (2013.01)

(58) Field of Classification Search
  CPC ..... G06F 21/105; G06F 21/62; H04L 63/102; H04L 63/08; H04L 2209/603; H04L 67/42
  See application file for complete search history.

(56) References Cited

U.S. PATENT DOCUMENTS

| | | | |
|---|---|---|---|
| 2006/0116966 A1* | 6/2006 | Pedersen | G06F 21/10 705/59 |
| 2007/0039054 A1* | 2/2007 | Mulla | G06F 21/73 726/26 |
| 2007/0107067 A1* | 5/2007 | Fountian | G06F 8/60 726/33 |
| 2008/0209575 A1* | 8/2008 | Conrado | G06F 21/10 726/29 |
| 2008/0301447 A1* | 12/2008 | Hughes | H04L 9/0891 713/176 |
| 2011/0196793 A1* | 8/2011 | Zheng | G06Q 30/00 705/50 |
| 2016/0232332 A1* | 8/2016 | Radian | G06F 21/105 |

OTHER PUBLICATIONS

Search Report for App. No. GB1704609.5, dated Aug. 30, 2017.*

* cited by examiner

*Primary Examiner* — Robert B Leung
(74) *Attorney, Agent, or Firm* — Keller Jolley Preece

(57) ABSTRACT

Systems and methods are disclosed for activating features of software products at a client device utilizing a features set ID embedded in an access token. In particular, in one or more embodiments, the disclosed systems and methods provide a master feature registry to a client device in conjunction with downloading a software product. Moreover, upon authenticating a user of the client device, the disclosed systems and methods generate a feature set ID indicating the software products the user is permitted to access. The disclosed systems and methods embed the generated feature set ID into an access token and send the access token to the client device. The client device can utilize the embedded feature set ID in conjunction with the master feature registry to identify authorized features. Moreover, the client device can activate the authorized features in relation to the software product.

20 Claims, 15 Drawing Sheets

CONTROLLING LICENSABLE FEATURES OF SOFTWARE USING ACCESS TOKENS

BACKGROUND

Recent years have seen a rapid proliferation in the use of cloud-based computing systems. For instance, it is now common for individuals and businesses to utilize remote servers for digital storage, web-hosting, or digital software deployment and support. Indeed, many conventional digital software systems install software products on client devices, but utilize remote servers for a variety of tasks in relation to the installed software products. For example, many conventional systems operate by downloading a software product on a client device and then utilizing remote servers to license the software product by generating, managing, and/or verifying licenses to activate the software product on the client device.

Although conventional licensing systems are able to provide software products to client devices, such conventional systems include a variety of problems. For example, conventional licensing systems are often complex and involve a variety of time consuming (and costly) steps and processes. For instance, many conventional digital licensing systems verify client devices, provide permissions to the client device, and undergo a variety of steps to obtain, decode, and utilize a license. For example, conventional digital licensing systems generate and maintain an active licensing server with complex encrypted licenses. Such licensing servers often determine the applicable licenses in response to a licensing activation call from a client device. In particular, conventional licensing servers may consult a database to fetch the applicable license and provide the to the client device to authorize access to the software product at the client device.

Not only are the foregoing steps complex, they also make it difficult to quickly and efficiently rollout software products. Indeed, in light of modifications required to the authenticating/licensing servers and databases it is difficult in conventional digital licensing systems to add or adjust software product and/or software product features. Accordingly, modifications and updates in conventional digital licensing systems lead to significant operational costs.

Furthermore, conventional digital licensing systems often require significant digital rights management ("DRM") schemes to protect software products from piracy or other intellectual theft. For example, without DRM schemes, software pirates can access licenses provided to a client device and utilize the licenses to obtain unauthorized access to software products (e.g., unauthorized access on other client devices). Although conventional digital licensing systems include DRM techniques, software pirates have historically found ways to circumvent conventional digital licensing systems, resulting in unauthorized use of software products, market and brand dilution, decreased customer satisfaction, and lost revenue.

These and other problems exist with regard to current techniques for licensing software products.

BRIEF SUMMARY

Embodiments of the present disclosure provide benefits and/or solve one or more of the foregoing or other problems in the art with systems and methods that embed feature data in access tokens to activate features of software products on a client device. In particular, in one or more embodiments, the disclosed systems and methods do away with separate licenses, license servers, and/or calls to license servers and activate software products utilizing feature data stored in memory at a client device. In particular, in one or more embodiments, the systems and methods provide a master feature registry to a client device. Moreover, systems and methods embed a feature set ID in an access token provided to the client device. The client device compares the master feature registry and the feature set ID stored in memory on the client device to determine a set of licensed features applicable to one or more software products. The client device can then activate the set of licensed features.

More particularly, in one or more embodiments, the disclosed systems and methods provide a master feature registry (i.e., a list of features of a plurality of software products) to a client device. Moreover, the disclosed systems and methods generate, based on the master feature registry, a feature set ID that indicates the software product and/or features that the user of the client device is permitted to access. The disclosed systems and methods embed the generated feature set ID into an access token. Furthermore, the disclosed systems and methods send the access token with the embedded feature set ID to the client device (e.g., in response to authenticating the user) such that the client device compares the master feature registry to the feature set ID and activates the software product and/or features that the user of the client device is permitted to access.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
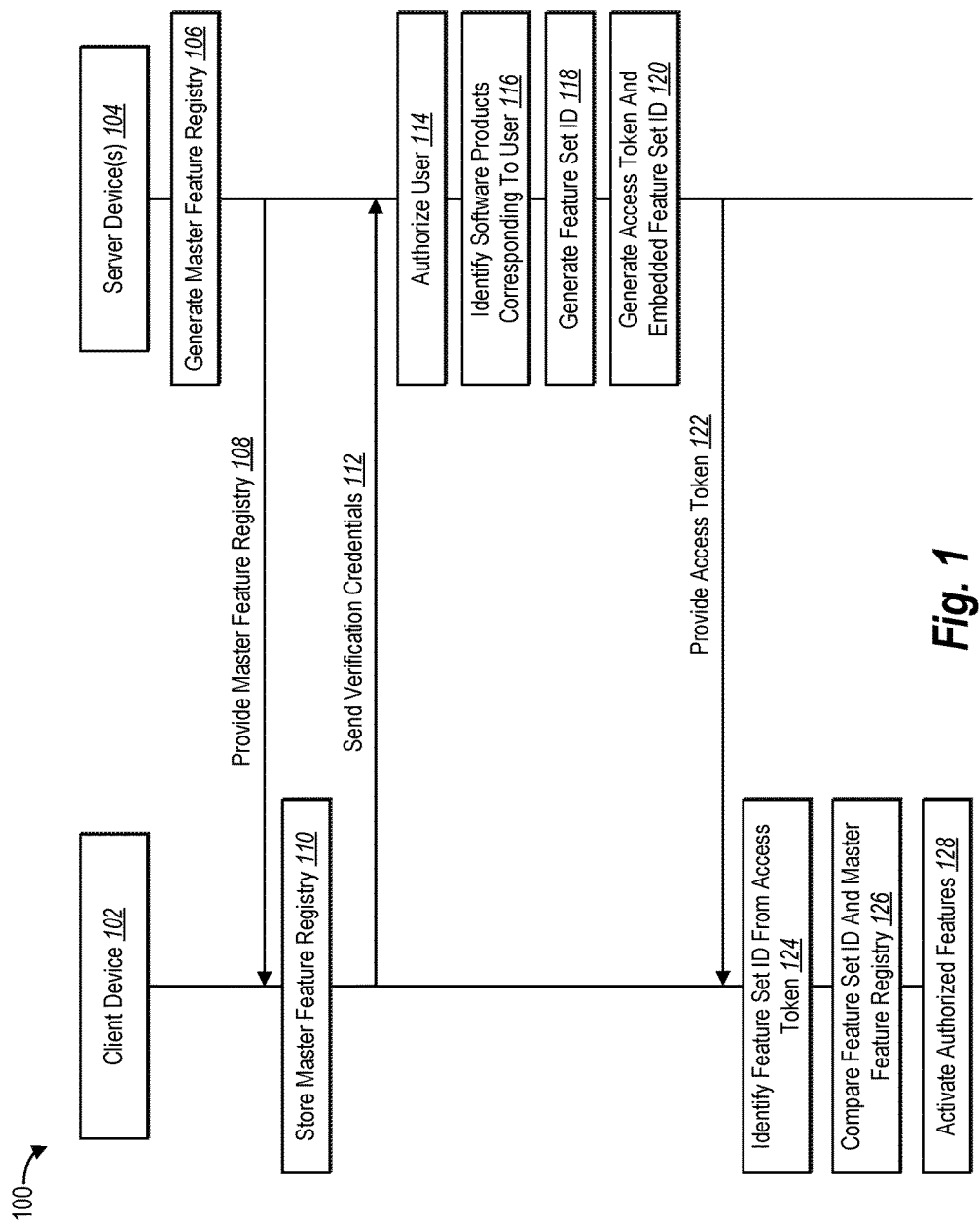
FIG. 1 illustrates a sequence diagram of a series of acts in a method of activating features of a software product in accordance with one or more embodiments.

One or more embodiments of the present disclosure include a digital feature activation system and corresponding methods that securely activate software products and/or features thereof utilizing feature data embedded in an access token. In particular, in one or more embodiments, the digital feature activation system stores feature data in memory at a client device and utilizes the feature data to activate features, rather than utilizing separate licenses and/or calls to licensing servers. For instance, in one or more embodiments, the digital feature activation system detects authorization (e.g., sign in via a username and password) of a user utilizing a client device and embeds a feature set ID (i.e., an indication of software products having features a user is permitted to access) into an access token. The client device can identify the feature set ID in the access token, and utilize the indication (e.g., in conjunction with a master feature registry stored on the client device) to identify features that the user of the client device is permitted to access.

For example, in one or more embodiments, the digital feature activation system provides, by one or more servers, a master feature registry to a client device (e.g., in conjunction with downloading a software product to the client device of a user). In particular, in one or more embodiments, the master feature registry lists features of a plurality of software products (including the downloaded software product). Moreover, the digital feature activation system generates a feature set ID that indicates the software product that the user of the client device is permitted to access. In addition, the digital feature activation system embeds the generated feature set ID into an access token. Furthermore, the digital feature activation system sends the access token with the embedded feature set ID to the client device in response to authenticating the user. The client device compares the master feature registry to the feature set ID and activates the features of the software product that the user of the client device is permitted to access based on the comparison.

By embedding a feature set ID in an access token, and utilizing the feature set ID in conjunction with a master feature registry on the client device, the digital feature activation system simplifies the process of activating software product features. Indeed, because feature data is moved into memory on the client device, the digital feature activation system eliminates many of the complex processes and systems of conventional digital licensing systems. For example, the digital feature activation system avoids the need for separate in-resident licenses on client devices. Similarly, the digital feature activation system avoids the need for calls and responses between a client device and a licensing server to obtain a software license, thus, removing needless communications and unnecessary utilization of communication facilities and processing power. Moreover, the digital feature activation system can eliminate the need for a licensing server altogether.

The digital feature activation system also reduces the risk of digital piracy and the cost of combating intellectual property theft. For example, in one or more embodiments, the digital feature activation system generates an access token embedded with a feature set ID upon each launch of a software product. Because the digital feature activation system does not utilize a local software license, the need for local DRM solutions (e.g., to protect the local software license) is no longer required. Rather, at each launch, the digital feature activation system securely provides secure access token with an embedded secure feature set ID, that activates the software product features that a user of the client device is permitted to access.

To help ensure security of the access token, the digital feature activation system optionally embeds an expiration time into the access token. The expiration time can prohibit utilization of a feature set ID after expiration of the access token. Because an access token is typically required for each session, the digital feature activation system increases security with short validity times. In contrast to conventional digital licensing systems (that utilize lengthy license subscription times (e.g., months or years) that open the door to digital piracy), utilizing short (e.g., 24 hour) expiration times with access tokens significantly limits digital piracy.

Moreover, because many software systems already utilize access tokens to authorize users, the digital feature activation system presents an elegant solution that exploits existing processes to streamline and simplify software product activation. Indeed, by embedding a feature set ID in an access token, the digital feature activation system not only eliminates the requirement for a local license and unnecessary data transfer between client devices and licensing servers, but the digital feature activation system does not cause any drop in performance. In fact, in one or more embodiments, the digital authorization system increases computing efficiency by eliminating encryption, de-encryption, and management of licenses that require significant computing power.

Furthermore, the digital feature activation system simplifies the process of adding, removing, or updating software products and corresponding features. Indeed, as described above, in one or more embodiments, the digital feature activation system utilizes a master feature registry, which identifies features and corresponding software products. Accordingly, to add, remove, or update software products and features, the digital feature activation system simply updates the master feature registry—modifications are then automatically reflected in the features activated at the client device. In this manner, the digital feature activation system allows software providers to refresh available software products and features in close to real time, while avoiding the myriad of operational steps (e.g., changes in metadata at licensing servers) required to updated licenses, licensing servers, and licensing processes.

In addition to simplifying the process of adding, removing, or updating software products and features, the digital feature activation system also makes it possible for multiple users of a client device to access different features of software products specific to each user. In contrast, in many conventional digital licensing systems, licenses are stored on client devices and are not specific to particular users. Accordingly, software products are activated in relation to the client device, providing all users with the same software product features. In one or more embodiments, the digital feature activation system stores the access token with the feature sets in local memory, and deletes the stored feature sets upon detecting a user sign out. If a new user signs in, the digital feature activation system can generate a new access token and new feature set ID specific to the new user, and utilize the new access token and new feature set ID to activate the features specific to the new user. In this manner, the digital feature activation system can seamlessly tailor features of software products to multiple users of a single client device.

Figure 3A:
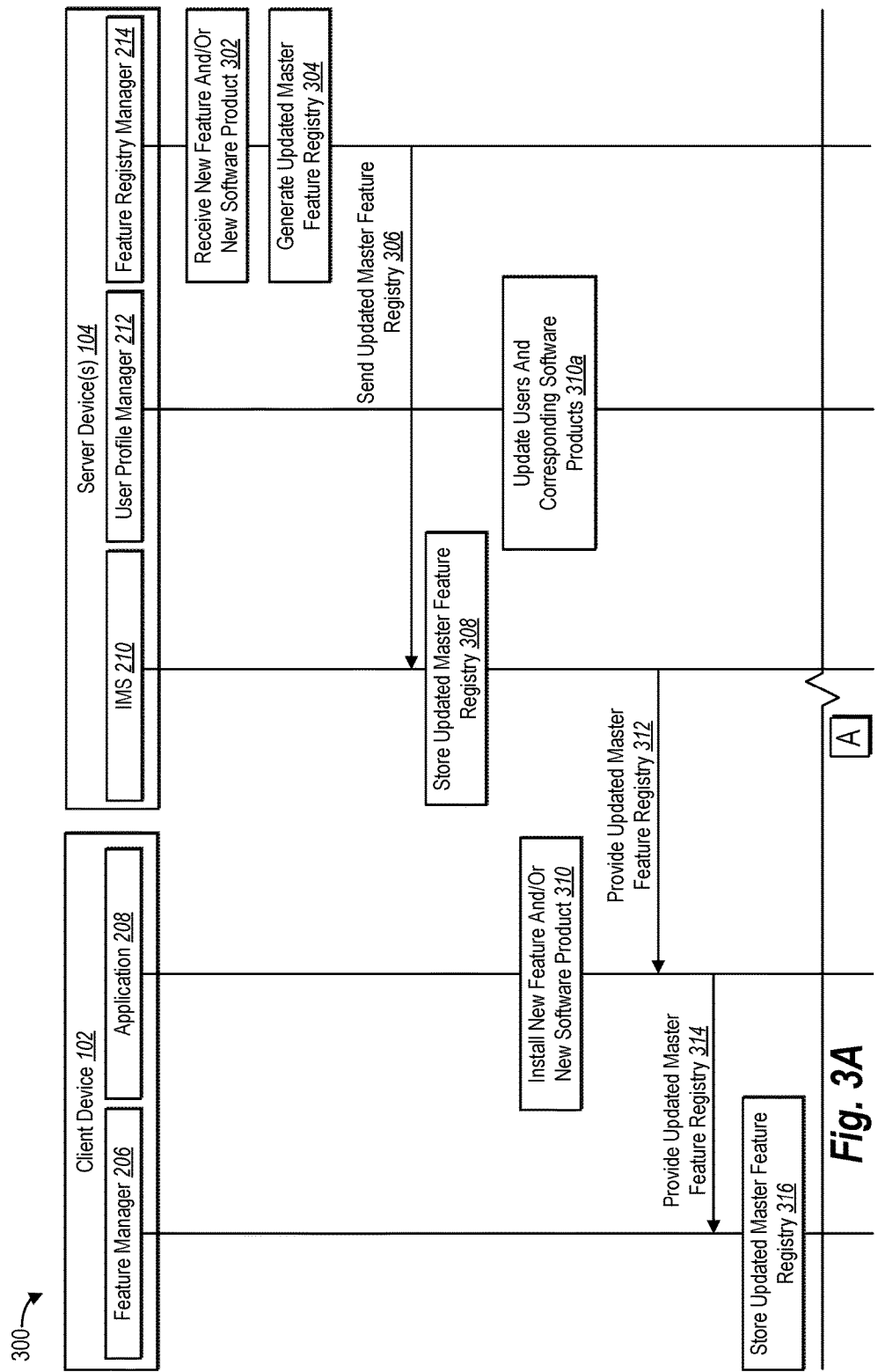
FIGS. 3A-3C illustrate yet another sequence diagram of a series of acts in a method of activating new features of a new software product on a client device in accordance with one or more embodiments.
Figure 3B:
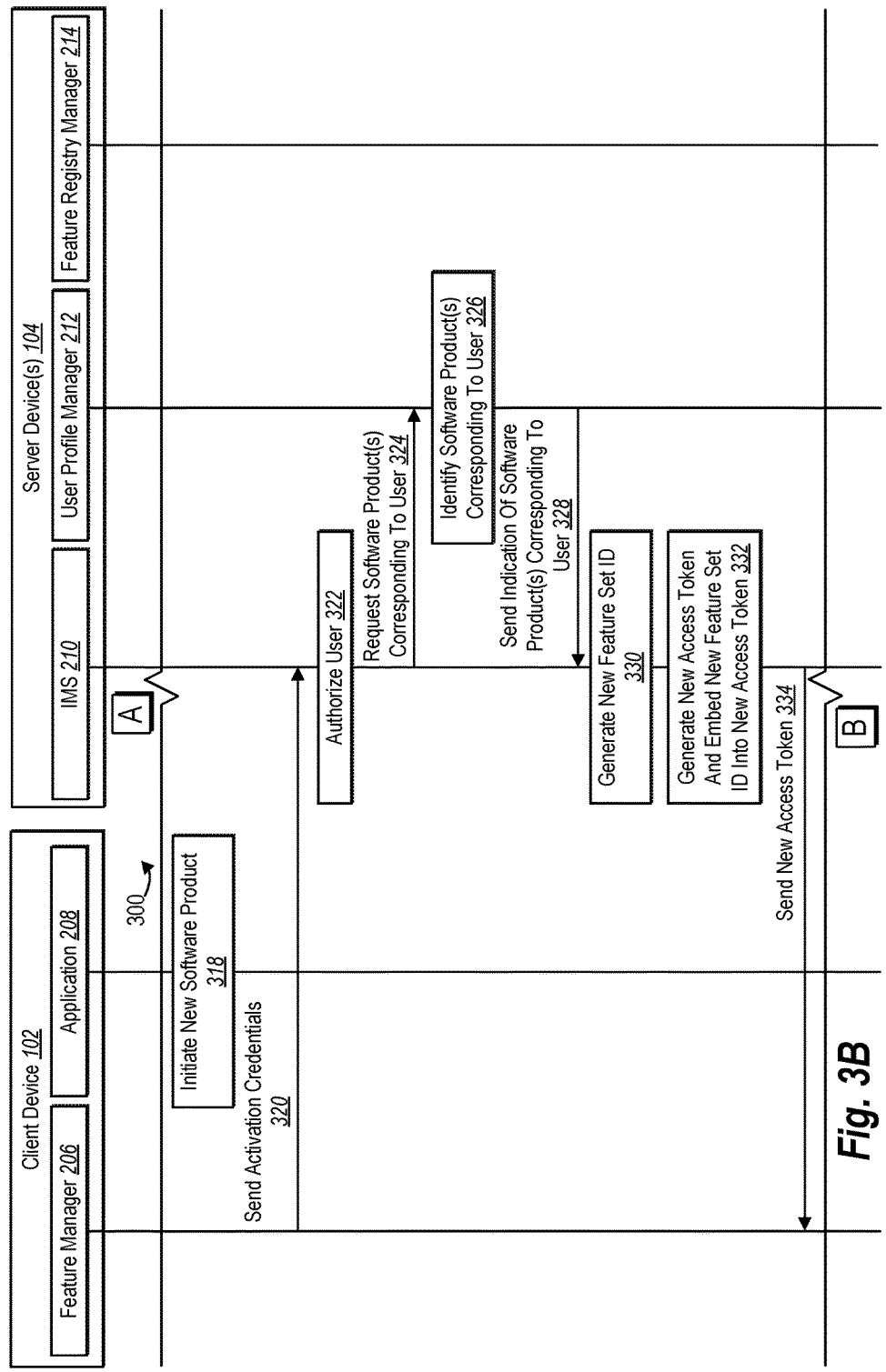
Figure 3C:
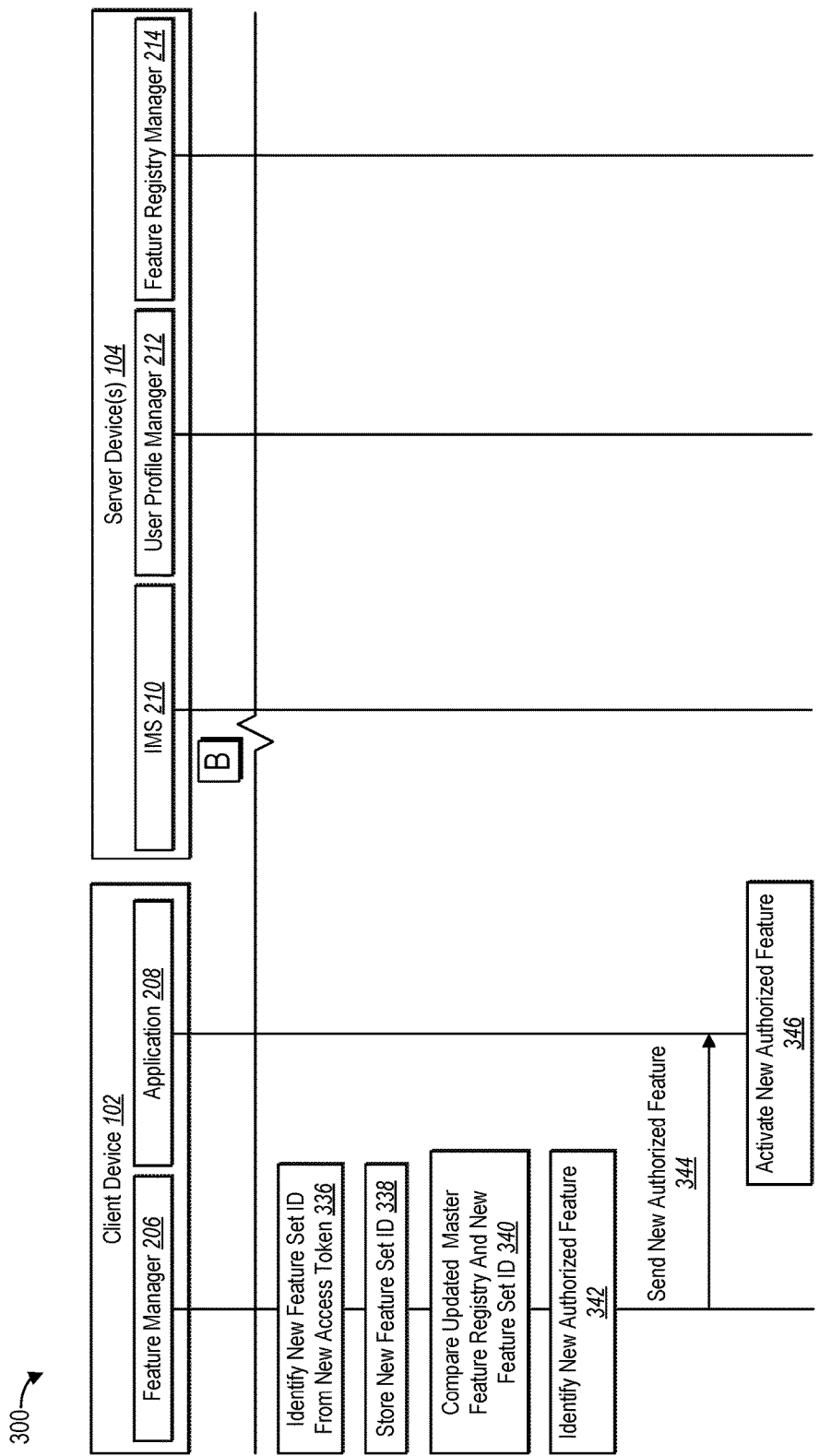
Figure 4A:
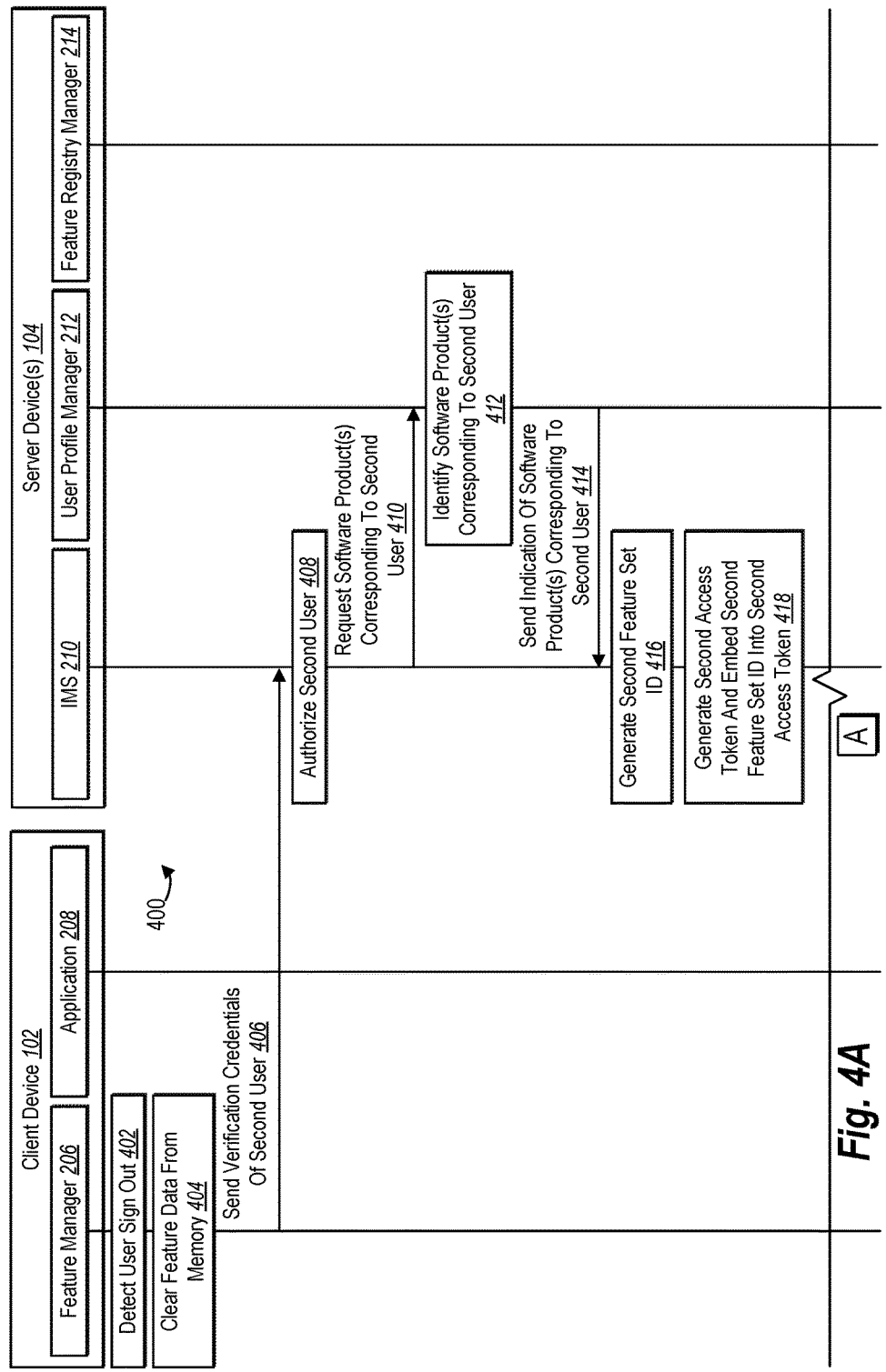
FIGS. 4A-4B illustrate a sequence diagram of a series of acts in a method of activating features of a software product on a client device corresponding to a second user of the client device in accordance with one or more embodiments.
Figure 4B:
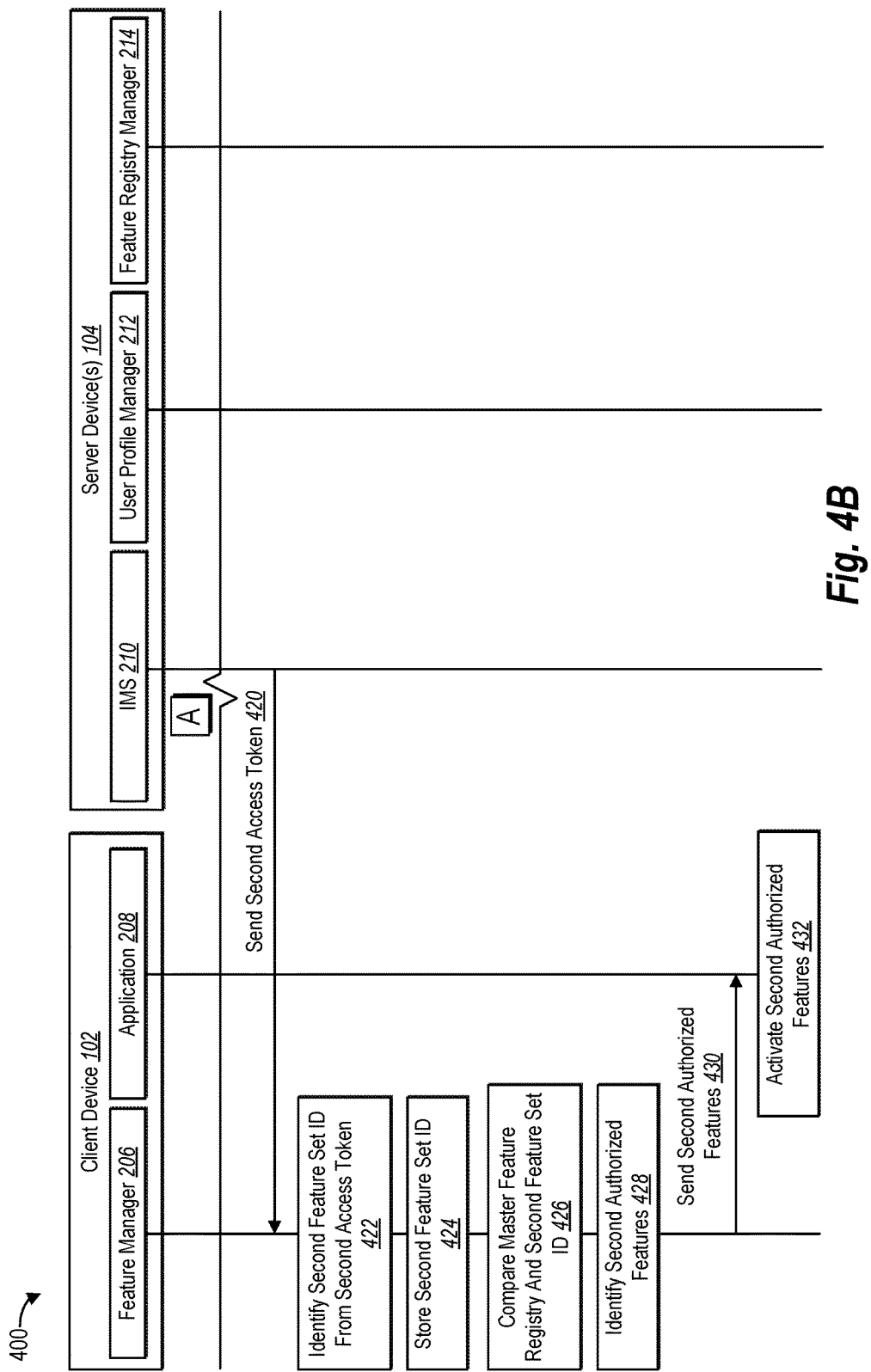
Figure 5:
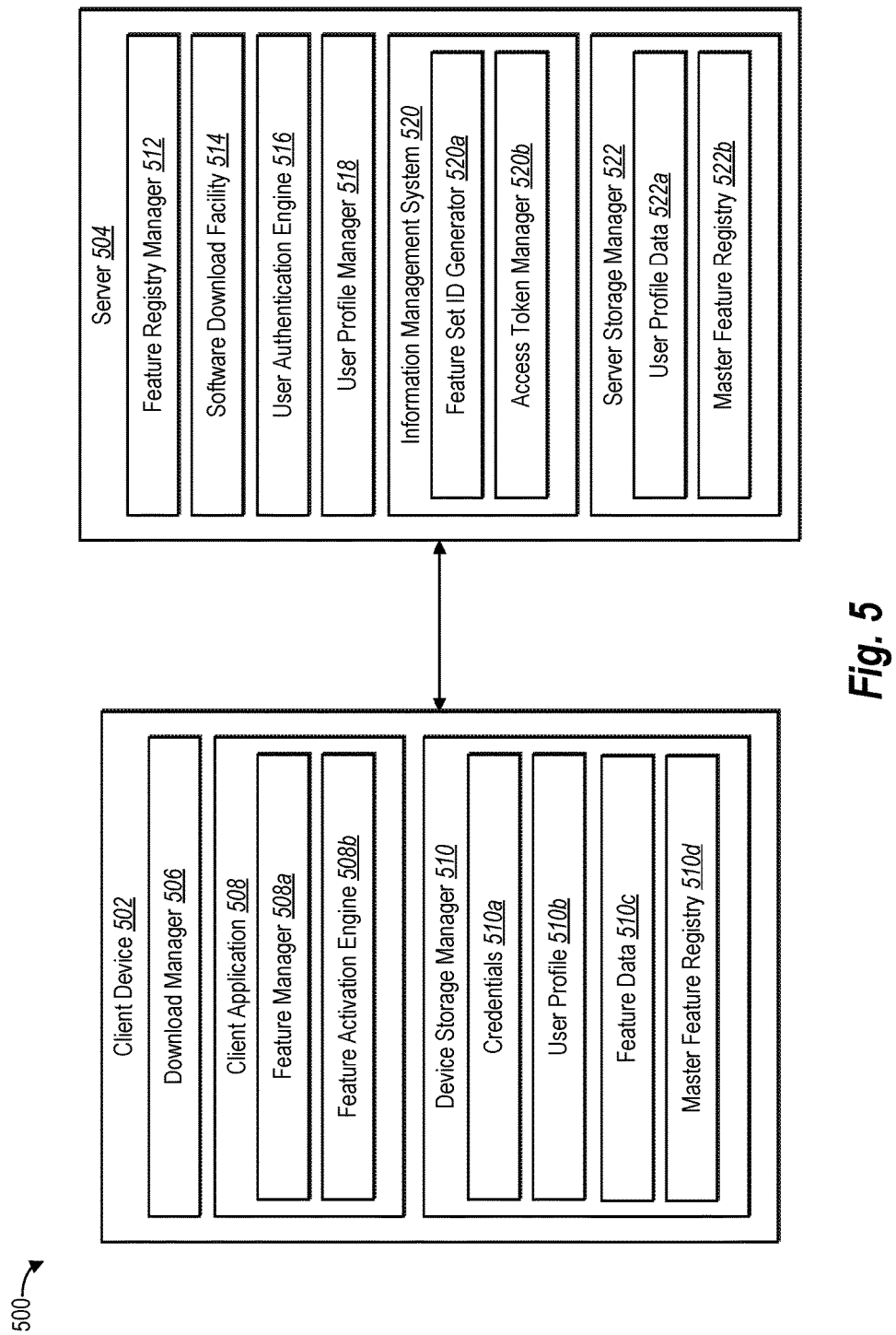
FIG. 5 illustrates a schematic diagram of a digital feature activation system in accordance with one or more embodiments.
Figure 6:
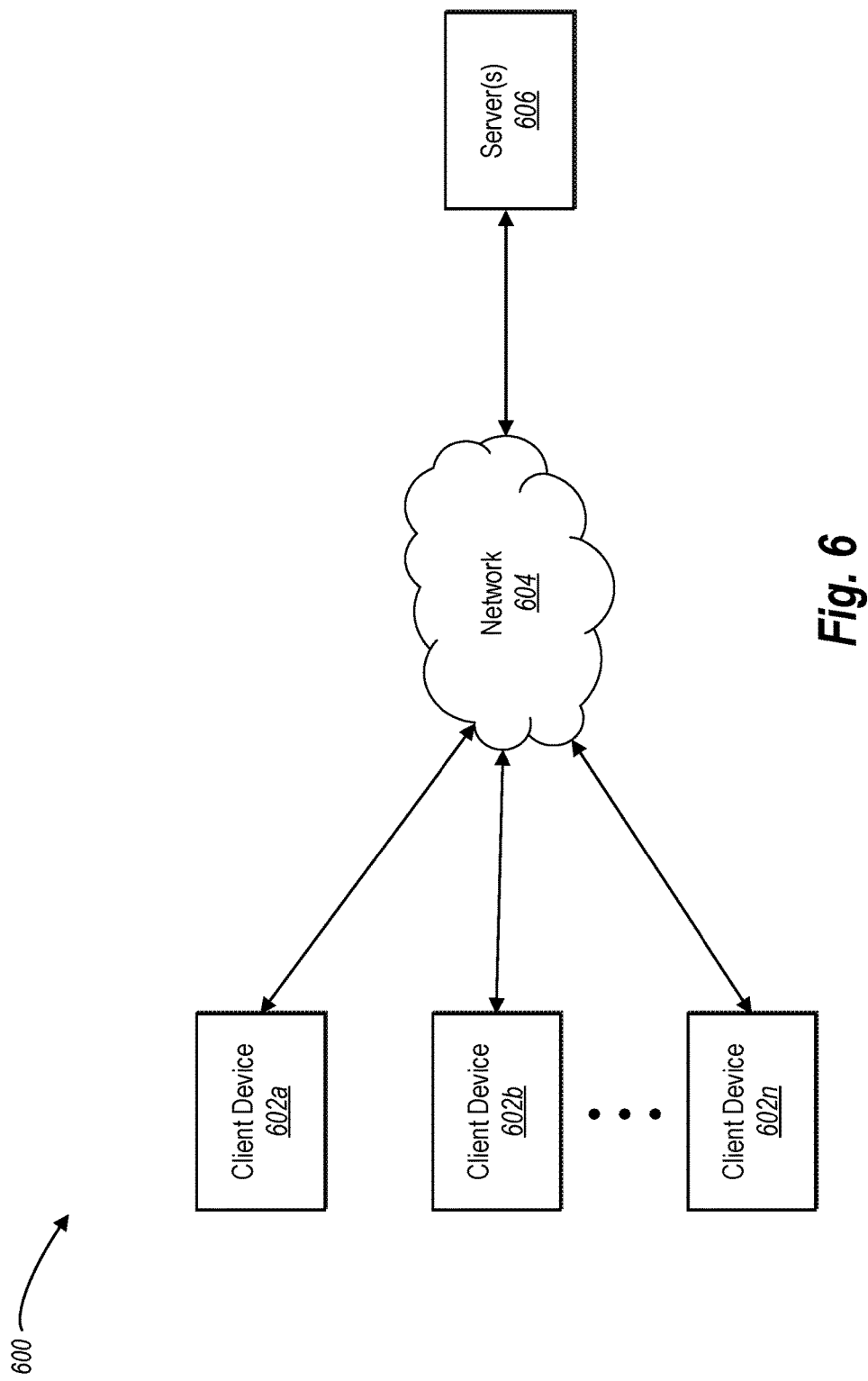
FIG. 6 illustrates a schematic diagram of an exemplary environment in which the digital feature activation system can operate in accordance with one or more embodiments.

Additional detail will now be provided regarding the digital feature activation system in relation to illustrative figures portraying exemplary embodiments. In particular, in relation to FIGS. 1-2C, disclosure is provided regarding steps in methods of activating software products by embedding software feature IDs in access tokens in accordance with one or more embodiments. Thereafter, FIGS. 3A-3C provide additional detail in relation to steps in methods of activating new features in relation to new software products by utilizing embedded feature IDs in access tokens. FIGS. 4A-4B and accompanying description provide additional disclosure in relation to methods of activating different features of software products on the same client device for multiple users in accordance with one or more embodiments. FIGS. 5-6 provide additional disclosure regarding components and capabilities of the digital feature activation system as well as an exemplary environment in which the digital feature activation system can operate.

As just mentioned, FIG. 1 illustrates a sequence diagram displaying a plurality of steps 106-128 performed by a digital feature activation system 100 for activating features of a software product. The digital feature activation system 100 can reside in part on client device 102 and server device(s) 104. In particular, as discussed in more detail below, the digital feature activation system 100 can comprise computer-executable instructions that, when executed by client device 102 or server device(s) 104, causes client device 102 or server device(s) to perform the steps 106-128 shown in the sequence diagram of FIG. 1. The client device 102 can comprise any computing device, such as a desktop, laptop, tablet, or mobile device. The server device(s) 104 can comprise a remote server that generates, stores, receives, and transmits data. For example, in one or more embodiments the server device(s) 104 comprise a remote communications server, an identification/authorization server, and/or a data server.

As illustrated in FIG. 1, digital feature activation system 100 performs the step 106 of generating a master feature registry. As used herein, the term "master feature registry" refers to a digital item that indicates features of one or more software products. In particular, the term "master feature registry" includes a database, table, array, or spreadsheet that lists (or otherwise indicates) features of corresponding software product(s). Moreover, in one or more embodiments, the master feature registry comprises a list of all features of all software products supported by a suite of application or by a software provider. In one or more embodiments, the term master feature registry includes a server generated file that includes a set of features of supported software products that are indexed by software product ID. Accordingly, as illustrated in FIG. 1A, the digital feature activation system 100 causes server device(s) 104 to generate a master feature registry that lists features of one or more software products.

As used herein, the term "feature" refers to a function, process, or ability of a software product. In particular, the term "feature" includes one or more functions, processes, or abilities of a software product that can be toggled (e.g., on or off, accessible or blocked, activated or deactivated). In one or more embodiments, the digital feature activation system utilizes a feature indicator to identify a feature or a set of features. For example, the digital feature activation system can utilize a feature indicator comprising a string, number, or code that identifies one or more features. Accordingly, in relation to FIG. 1, the server device(s) 104 generates a master feature registry that lists feature indicators in conjunction with corresponding software product IDs.

As used herein, the term "software product" refers to a software program executed on a computing device. In particular, the term "software product" refers to an organized collection of computer instructions that, when executed by a computing device, cause the computing device to perform one or more tasks. The term "software product" includes, in one or more embodiments, a collection of computer instructions marketed and sold as a single application or a suite (i.e., collection) of applications.

Moreover, as used herein, the term "software product ID" refers to an indicator of a software product. For example, in one or more embodiments, the software product ID refers to a code, value, string, or other indicator utilized to identify a software product. A software product ID can take a variety of forms. For example, a software product ID can comprise a binary number or another character string.

It will be appreciated that a particular software program brand can be sold and marketed as a number of different software products with a number of different features and software product IDs. For example, the ADOBE® PHOTOSHOP® software program may be marketed and sold as a first software product (e.g., a basic subscription), with a corresponding first software product ID where the user is permitted to access a first set of features, whereas the ADOBE® PHOTOSHOP® software program can also be marketed and sold as a second software product (e.g., an advanced subscription) corresponding to a second software product ID where the user is permitted to access a second set of features.

Returning to FIG. 1, upon generating the master feature registry, the server device(s) 104 performs the step 108 of providing the master feature registry to the client device 102. In one or more embodiments, the server device(s) 104 provide the master feature registry in conjunction with downloading one or more software products to the client device 102. In this manner, the digital feature activation system can ensure that any client device that downloads a software product has a master feature registry.

Moreover, the client device 102 performs the step 110 of storing the master feature registry. As described above, by storing the master feature registry, in one or more embodiments, the digital feature activation system moves the process of overseeing licensed software products to the memory of the client device 102 (rather than the server device(s) 104).

As shown in FIG. 1, the client device 102 also performs the step 112 of sending verification credentials. As used herein, the term "verification credential" refers to information provided by a client device to verify the identity of a user or client device. In particular, the term "verification credential" includes login information, such as a user name and/or password. Similarly, the term "verification credential" includes a unique identification, such as a globally unique identifier ("GUID") corresponding to a user or device. For example, in one or more embodiments, the server device(s) 104 provide the client device 102 with a delegate GUID upon first authenticating a user of the client device 102. Thereafter, the client device 102 can utilize the delegate GUID to authenticate the user and/or client device. The term "verification credential" includes such a delegate GUID. Moreover, the term "verification credential" can include a device token or device ID corresponding to the client device 102.

In one or more embodiments, the step 112 of sending verification credentials is performed in relation to a call to the server device(s) 104 to request authentication and/or utilize one or more software products. For example, in one or more embodiments, the client device 102 performs the step 112 each time a software product downloaded from the server device(s) 104 is initiated on the client device 102. As outlined below, in this manner, the digital feature activation system 100 can ensure that the proper features are activated each time a software product is utilized on a client device.

Upon sending verification credentials to the server device(s) 104, the server device(s) 104 performs the step 114 of authorizing the user. In particular, in one or more embodiments, the server device(s) 104 can utilize the verification credentials to authorize the user. For example, the server device(s) 104 sends the verification credentials to an authorization system that verifies the identity of the user (e.g., that a user has an account and privileges to access one or more software products) or perform the verification steps at the server device(s). The step 114 can comprise signing a user into an account associated with the user, such as an account associated with a user profile or other information corresponding to the user.

Moreover, upon authorizing the user, the server device(s) 104 performs the step 116 of identifying software products corresponding to, or licensed to, the user. In particular, the server device(s) 104 can access a user profile (or account) of the server device(s) 104 to determine software products that the user is permitted to utilize (e.g., software products the user has purchased).

Furthermore, as shown in FIG. 1, upon identifying software products corresponding to the user, the server device(s) 104 also performs the step 118 of generating a feature set ID. As used herein, the term "feature set ID" refers to an indicator of one or more software products and/or features a user is permitted/authorized to utilize. In particular, the term "feature set ID" includes an indicator of one or more software product IDs (and/or feature indicators) that a user is permitted to utilize. For example, a feature set ID includes a series of digits that indicate software product IDs corresponding to software products and corresponding features a user is permitted to utilize. A feature set ID can take a variety of forms, such as a binary number, a base 64 number, or some other combination of characters or data. In one or more embodiments, the feature set ID comprises a bit string value, where each bit is reserved as an indicator of whether a user is permitted to utilize one or more software products and/or features. More specifically, in one or more embodiments, the feature set ID comprises a 256-bit string value, where each bit is reserved as true or false indicator of a corresponding software product ID for software product feature.

As shown in FIG. 1, upon generating a feature set ID, the server device(s) 104 also perform the step 120 of generating an access token and embedding the feature set ID in the access token. As used herein, the term "access token" refers to a digital item that indicates the privileges of a user and/or a client device. In particular, the term "access token" can include a digital item configured to provide permission to access on one or more remote servers. Thus, the term "access token" includes a temporary token issued by an identification or authentication system upon authenticating a user or device that identifies the permissions of the user in relation to one or more servers. Similarly, the term "access token" includes a temporary token issued by an identification system upon refreshing a session with a client device. More specifically, in one or more embodiments, an access token comprises a JSON web token with one or more extensions.

Accordingly, in one or more embodiments, the server device(s) 104 generate the access token by embedding the feature set ID in one or more extensions of a JSON web token. In addition to containing an embedded feature set ID, the resulting access token can also provide the client device 102 with access to a variety of information on the server device(s) 104, such as digital content (digital media, digital video, digital images, digital fonts, and/or digital styles) stored on data servers of the server device(s) 104.

As illustrated in FIG. 1, upon generating the access token and embedding the feature set ID, the server device(s) 104 perform the step 122 of providing the access token to the client device 102. Moreover, the client device 102 performs the step 124 of identifying the feature set ID from the access token. For example, the client device 102 analyzes a JSON web token and identify a feature set ID embedded in one or more extensions of the JSON web token.

Upon identifying the feature set ID from the access token, the client device 102 performs the step 126 of comparing the feature set ID and the master feature registry. In particular, the client device 102 can compare the feature set ID with entries in the master feature registry to identify features that the user is permitted to access (i.e., authorized features).

For example, as discussed previously, in one or more embodiments, the feature set ID comprises a 256-bit string value pointing to one or more software products (e.g., software product IDs). The client device 102 can access the master feature registry (i.e., the listing of products and corresponding features in the master feature registry) and compare the feature set ID with the master feature registry to identify authorized features (i.e., features the user is permitted to access). Moreover, the client device 102 can store the authorized features for later use.

Moreover, as shown in FIG. 1, upon comparing the feature set ID and master feature registry, the client device 102 performs the step 128 of activating authorized features (i.e., the features the user is permitted to access). In particular, the client device 102 can load the authorized features into memory of the software product. Moreover, the client device 102 can utilize the software product to activate the authorized features identified at step 126.

Notably, the digital feature activation system 100 activates the authorized feature set on the client device 102 without placing a call to a licensing server, without downloading a license on to the client device 102, and without having a license stored on the client device 102. Rather, the digital feature activation system 100 activates the authorized feature set of one or more software products based on the access token with an embedded feature set ID. Accordingly, the digital feature activation system 100 reduces the complexity and communication required between the server device(s) 104 and the client device 102 in activating features of software products without sacrificing security of the software product.

Moreover, as mentioned, in one or more embodiments, the digital feature activation system 100 obtains an access token each time the client device 102 logs into the server device(s) 104. Accordingly, digital feature activation system verifies authorized features of the software product each time a user utilizes the software product, resulting in increased security of the software product and decreased piracy.

Furthermore, as illustrated in FIG. 1, in one or more embodiments the digital feature activation system 100 eliminates the need for complex DRM solutions. For example, in one or more embodiments, the digital feature activation system 100 avoids the need for complex encryption/de-encryption of licenses. Indeed, in one or more embodiments, the digital feature activation system 100 avoids the need for licenses stored on the client device altogether.

Figure 2A:
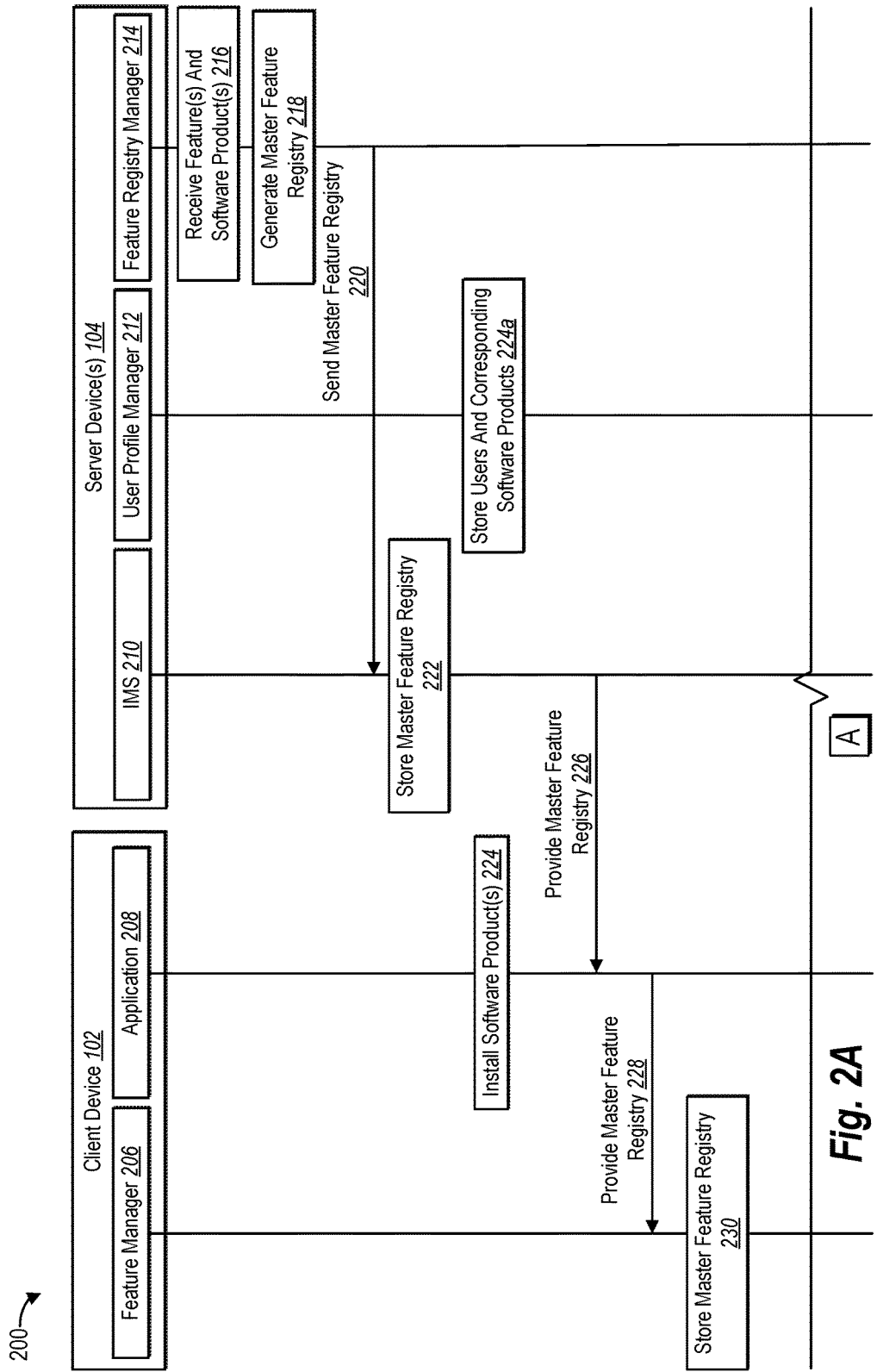
FIGS. 2A-2C illustrate another sequence diagram of a series of acts in a method of activating features of a software product on a client device in accordance with one or more embodiments.
Figure 2B:
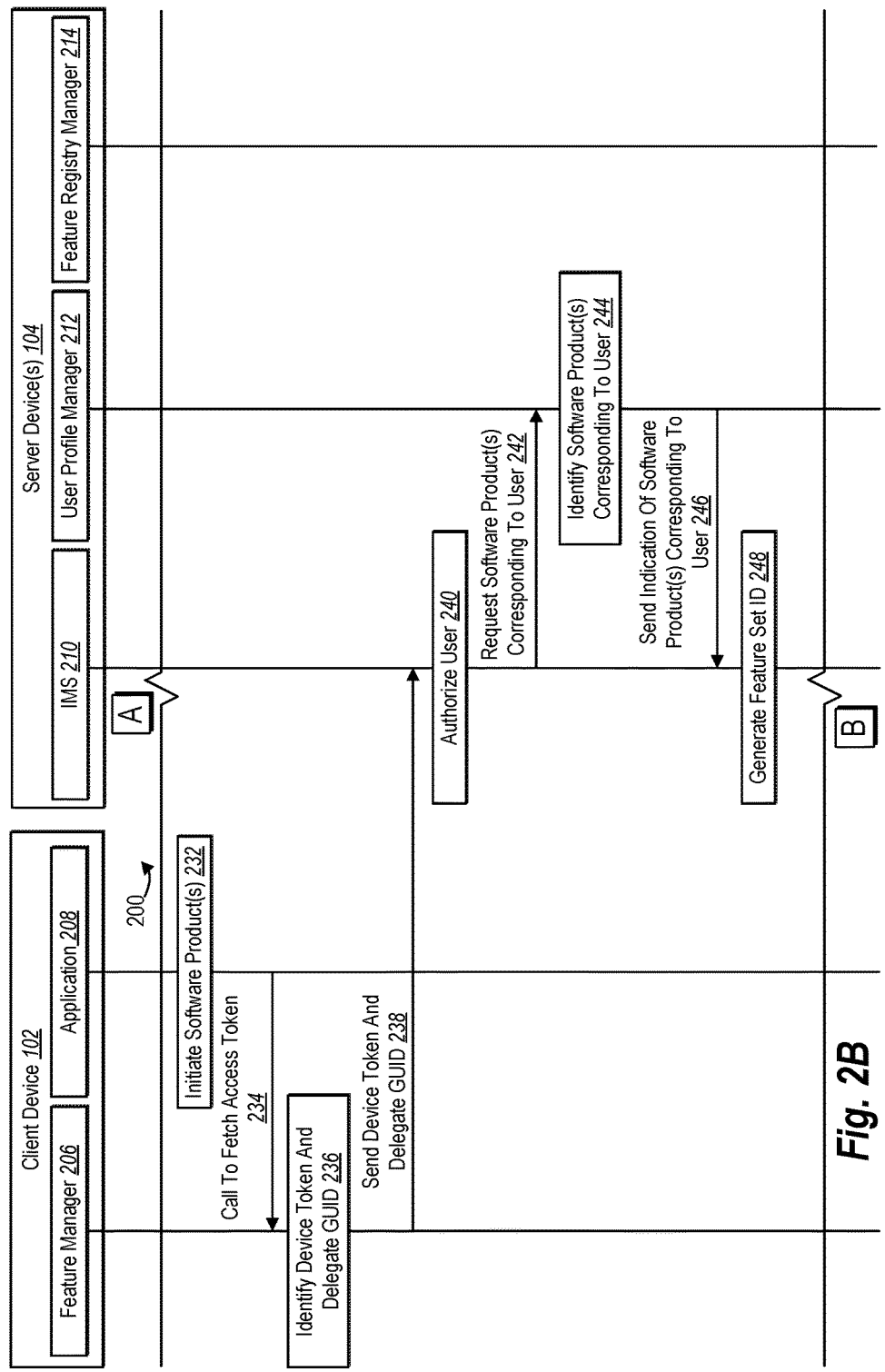
Figure 2C:
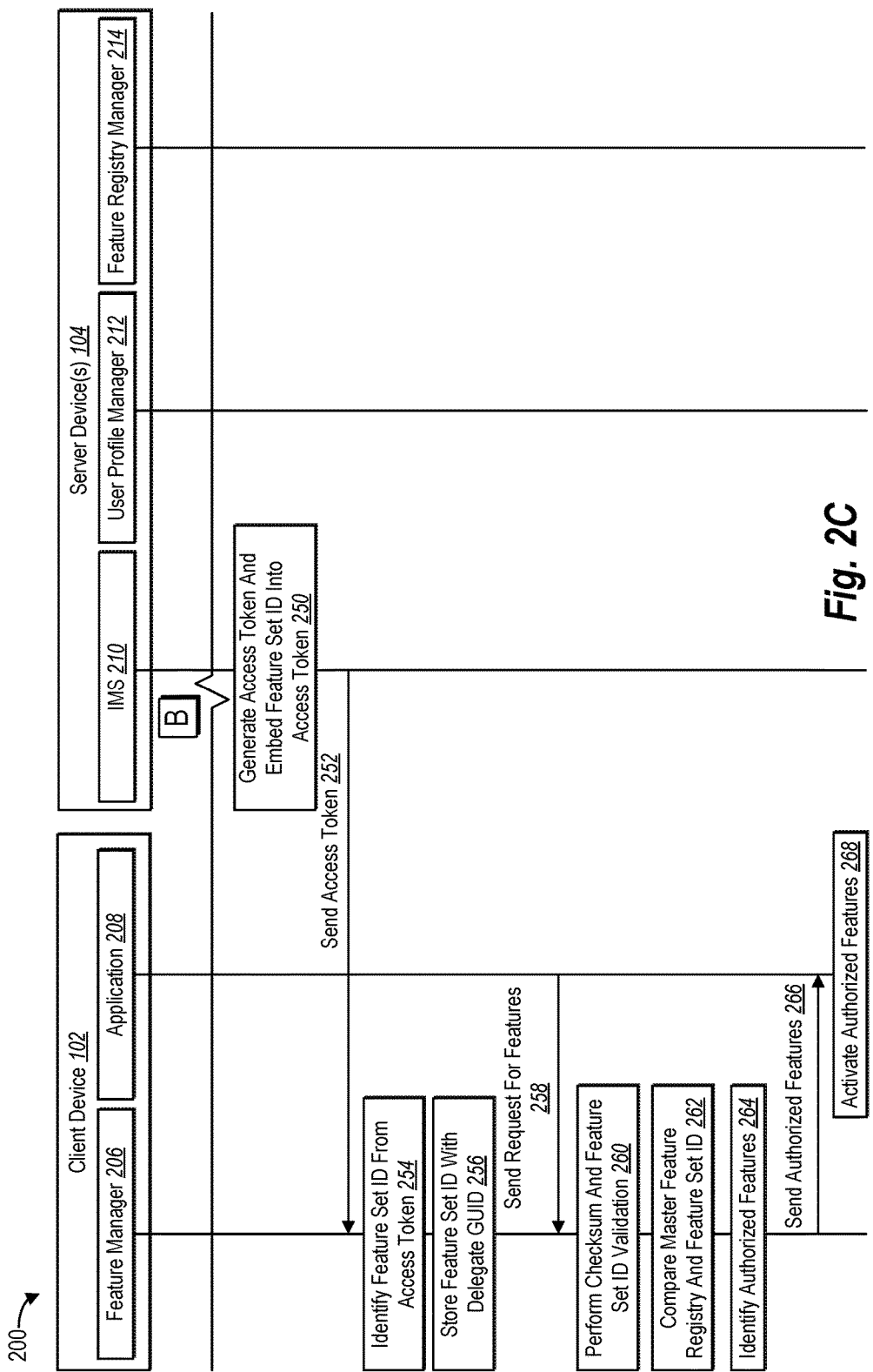

Turning now to FIGS. 2A-2C, additional detail is provided regarding steps performed by a digital feature activation system 200 for utilizing an access token with an embedded feature set ID to activate features of a software product on a client device. In particular, FIG. 2A illustrates digital feature activation system 200 performing steps 216-268 via the client device 102 and the server device(s) 104. Moreover, in relation to the method 200, the client device 102 further includes a feature manager 206 and an application 208 of the digital feature activation system 200. In addition, the server device(s) 104 further include an information management system ("IMS") 210, a user profile manager 212, and a feature registry manager 214 of the digital feature activation system 200.

The application 208 on the client device 102 can comprise any software product (e.g., a single software program or a suite of software programs). For instance, in one or more embodiments, the application 208 comprises a software management application that manages a plurality of software products on the client device 102. To illustrate, the application 208 can comprise one or more versions of the ADOBE® CREATIVE® CLOUD® software program managing a plurality of additional software programs, such as ADOBE® PHOTOSHOP® software, ADOBE® INDESIGN® software, and/or ADOBE® ILLUSTRATOR® software.

As shown, the client device 102 also includes the feature manager 206. As outlined further in relation to steps of the method 200, the feature manager 206 can identify, detect, obtain, and/or manage features that a user is permitted to utilize in relation to the application 208. As illustrated in relation to FIG. 2A, the feature manager 206 can comprise a stand-alone component of the digital feature activation system 200. Moreover, in one or more embodiments, the feature manager 206 is implemented as a portion of the application 208 (e.g., as a library, plug-in or other sub-portion of the application 208).

Moreover, as shown in FIG. 2A, the server device(s) 104 also includes the information management system 210, the user profile manager 212, and the feature registry manager 214. The information management system 210 can communicate, send, receive, and store information for the server device(s) 104. The user profile manager 212 contains information regarding one or more users of the digital feature activation system 200, including information regarding users and software products users are permitted to utilize. Moreover, the feature registry manager 214 can receive features and/or product identifiers and generate one or more master feature registries. Additional detail will be provided below (e.g., in relation to FIG. 5), regarding the client device 102, the feature manager 206, the application 208, the server device(s) 104, the IMS 210, the user profile 212, and the feature registry manager 214.

As shown in FIG. 2A, the digital feature activation system 200 causes the feature registry manager 214 to perform the step 216 of receiving features and software products. In particular, the step 216 can comprise the feature registry manager 214 receiving features and corresponding software product IDs. For example, in one or more embodiments the feature registry manager 214 receives features and corresponding software product IDs from software developers as software products and/or features are generated or released.

As mentioned previously, in one or more embodiments, the digital feature activation system 200 indicates one or more features utilizing a feature indicator. In relation to the embodiment of FIGS. 2A-2C, the feature indicator comprises a character string that identifies a set of features in relation to a corresponding software product version (e.g., a feature indicator of the form "Photoshop-Content-Aware 1.0"). Accordingly, in relation to the step 216, the feature registry manager 214 can receive a feature indicator and corresponding software product IDs from software developers.

In one or more embodiments, the digital feature activation system provides a feature registry console hosted on the server device(s) 104 for receiving user input of features and software product IDs. In particular, in one or more embodiments, the feature registry console comprises a user interface that allows software developers to declare or define software product IDs and corresponding features (e.g., define software product IDs and corresponding feature indicators). Accordingly, the digital feature activation system can provide a convenient and simple interface for software developers to define software products and corresponding features utilized in the digital feature activation system.

Moreover, as shown in FIG. 2A, upon receiving features and software products, the feature registry manager 214 also performs the step 218 of generating a master feature registry. Specifically, in relation to the embodiment of FIG. 2A, the step 218 comprises generating a master feature registry that lists software product IDs and corresponding feature indicators. More specifically, the following sample array provides the general form of a master feature registry in accordance with one or more embodiments:

Software Product ID A::Feature Identifier 1a{|} . . . Feature Identifier Xa
Software Product ID B::Feature Identifier 1b{|} . . . {|}Feature Identifier Xb
Software Product ID N::Feature Identifier 1n{|} . . . {|}Feature Identifier Xn In relation to this example, Software Product ID A through Software Product ID N indicate the software product IDs for supported software products. In addition, the Feature Identifiers 1a-Xa indicate the software features corresponding to Software Product A. Similarly, the Feature Identifiers 1b-Xb indicate the software features corresponding to Software Product B and the Feature Identifiers 1n-Xn indicate the software features corresponding to the Software Product N. Accordingly, the master feature registry lists features of a plurality of software products, indexed according to software product ID.

As mentioned above, in one or more embodiments the digital feature activation system 200 expresses software product IDs in the form of 256-bit string values and expresses feature identifiers in the form of character strings. In such embodiments, a master feature registry takes the following form:

0000 . . . 01 :: PhotoshopCC-Base-1.0{|} . . . {|}PhotoshopCC-Content-Aware-2.0{|}
. . .
0000 . . . 10 :: InDesignCC-Base-1.0{|} . . . {|}InDesignCC-Uber-2

In relation to this example, the first 256-bit string values (i.e., "0000 . . . 001" and "0000 . . . 10") are the software product IDs, and the character strings (i.e., "PhotoshopCC-Base-1.0" and "InDesignCC-Base-1.0") are the feature indicators. In particular, in relation to this particular example, the "01" at the conclusion of the first software product ID indicates a particular software product corresponding to the ADOBE® PHOTOSHOP® software program brand with certain corresponding features. Similarly, the "10" at the conclusion of the second software product ID indicates a particular software product corresponding to the ADOBE® INDESIGN® software program brand with certain corresponding features.

Although the previous example illustrates a simplified master feature registry with two software product IDs, it will be appreciated that the digital feature activation system can generate a master feature registry with any number of software products and any number of corresponding features. Indeed, in one or more embodiments, the master feature registry lists all software products and features supported by a software provider.

Moreover, the master feature registry may contain one or more suite software products that comprise a collection of software products. For example, a master feature registry can include a suite software product that provides access to a particular version of the ADOBE® PHOTOSHOP® software program together with a particular version of the ADOBE® INDESIGN® software program. In such embodiments, in relation to suite software products the master feature registry can point to other software product IDs defined in the master feature registry. For example, for a suite software product comprising particular versions of the ADOBE® PHOTOSHOP® software product and the ADOBE® INDESIGN® software product, the suite software product entry in the master feature registry can simply point to the software product IDs for the particular versions of the ADOBE® PHOTOSHOP® software program and the ADOBE® INDESIGN® software program.

As illustrated in FIG. 2, upon generating a master feature registry, the feature registry manager 214 performs the step 220 of sending the master feature registry to the IMS 210. Moreover, the IMS 210 can perform the step 222 of storing the master feature registry. In this manner, the IMS 210 can obtain the master feature registry in preparation for disseminating the master feature registry to client devices.

Indeed, as illustrated in FIG. 2A, the client device 102 performs the step 224 of installing software product(s). In particular, the client device 102 can send a request to the server device(s) 104 and download the software product(s) (e.g., download the application 208). For example, a user of the client device 102 selects software product(s), provide verification credentials (e.g., user name and password), and provide payment for the software product(s). Moreover, the client device 102 can download and install the software product(s) from the server device(s) 104.

In addition, as illustrated in FIG. 2, the server device(s) 104, via the user profile manager 212, performs the step 224a of storing users and corresponding software products. In particular, the user profile manager 212 can maintain a database (e.g., a database of user profiles and/or accounts) associating users with software products that each user has permission to utilize. For example, upon determining that a user of the client device 102 purchased, downloaded, and/or installed the software product(s), the user profile manager 212 stores within a user profile corresponding to the user an indication that the user has purchased, downloaded, and/or installed the software product(s). Moreover, the user profile manager 212 can maintain and update user profiles to reflect software product(s) that a user has permission to utilize at any given time.

As shown in FIG. 2, in conjunction with downloading and/or installing the software product(s), the IMS 210 also performs the step 226 of providing the master feature registry to the application 208 of the client device 102. For example, in one or more embodiments, the application 208 comprises the installed software product(s) and the IMS 210 downloads the master feature registry in memory of the installed software product(s).

Moreover, the application 208 can perform the step 228 of providing the master feature registry to the feature manager 206. The feature manager 206 can also perform the step 230 of storing the master feature registry. In this manner, the digital feature activation system 200 can store the master feature registry in memory of the client device 102 for utilization in identifying, at the client device, features to activate in the software products based on a feature set ID embedded in an access token.

Indeed, as shown in FIG. 2B, the application 208 performs the step 232 of initiating the software product(s) (e.g., the application 208). In response to initiating the software product(s), the application 208 performs the step 234 of sending a call to fetch an access token to the feature manager 206. The feature manager 206, in turn, performs the step 236 of identifying a device token and delegate GUID.

As mentioned previously, the device token and the delegate GUID comprise one form of verification credentials. In particular, the device token comprises a digital item identifying the client device 102. Moreover, the delegate GUID is a globally unique identifier that indicates a particular user. For example, in one or more embodiments, the delegate GUID is a unique identifier generated by the server device(s) 104 (and/or the client device 102) that indicates a particular user in relation to a user profile stored by the user profile manager 212. In one or more embodiments, the delegate GUID identifies the last user to sign into an account associated with the server device(s) 104.

For example, the client device 102 obtains the delegate GUID in relation to a first authorization with the server device(s) 104. For instance, in one or more embodiments, a user of the client device 102 provides a username, password, or other verifying credentials the first time the user accesses an account of the server device(s) 104. The server device(s) 104 can provide the delegate GUID as a unique identifier stored by the client device 102 to identify the user for subsequent calls to the server device(s) 104.

As shown in FIG. 2B, the feature manager 206 performs the step 238 of sending the device token and delegate GUID to the IMS 210. Moreover, the IMS 210 performs the step 240 of authorizing the user. In particular, the IMS 210 can authenticate the user via an authentication or identity server utilizing the device token and delegate GUID (or other verification credentials). Moreover, the steps 238, 240 can comprise signing into an account associated with the user.

Upon authorizing the user, as illustrated in FIG. 2B, the IMS 210 performs the step 242 of requesting software product(s) corresponding to the user from the user profile manager 212. For example, the IMS 210 sends the delegate GUID to the user profile manager 212 to request software product(s) from the user profile corresponding to the user.

Moreover, in response to the request for software product(s), the user profile manager 212 performs the steps 244, 246 of identifying software product(s) corresponding to the user (e.g., software products stored in the step 224a) and sending an indication of the software product(s) corresponding to the user. Specifically, in one or more embodiments, the user profile manager 212 stores software product ID(s) corresponding to the software product(s) a user is permitted to access. The steps 244, 246 can comprise identifying the software product ID(s) corresponding to the software product(s) the user is permitted to access and sending the software product IDs to the IMS 210.

As shown in FIG. 2B, upon receiving an indication of the software product(s) corresponding to the user, the digital feature activation system 200 performs the step 248 of generating a feature set ID. In particular, the IMS 210 utilizes the indication of the software product(s) (i.e., from step 246) to generate a feature set ID. For example, in one or more embodiments, the IMS 210 consults the master feature registry to identify product ID(s) corresponding to the software product(s) the user is permitted to access. Moreover, the IMS 210 utilizes the product ID(s) to generate a feature set ID.

As mentioned previously, in one or more embodiments, the feature set ID points to product ID(s) corresponding the software product(s) that the user is permitted to access. More specifically, in one or more embodiments, the feature set ID is a 256-bit string value where each bit is reserved as an indication for a particular software product or product ID.

For example, consider an example where the user profile manager 212 provides an indication that the user is permitted to access a first software product and a second software product. The IMS 210 accesses the master feature registry and determines a first product ID of the first software product and a second product ID of the second software product. The IMS 210 can determine that the last bit in the feature set ID is reserved for the first software product. Accordingly, the IMS 210 can generate the following feature set ID: 0000 . . . 01 (e.g., the same product ID described in relation to step 218). Similarly, the IMS 210 can determine that the second to last bit in the feature set ID is reserved for the second software product. Accordingly, the IMS 210 can modify the feature set ID as follows: 0000 . . . 11 (e.g., add an affirmative "1" to the second to last bit to form a combination of the two product IDs described in relation to step 218). In this manner, the IMS 210 generates a feature set ID that indicates the first software product and the second software product that the user is permitted to access.

As mentioned above, the feature set ID can be expressed in a variety of forms. For example, in one or more embodiments, the step 248 comprises modifying the form of the feature set ID. In particular, in one or more embodiments, the digital feature activation system 200 transforms the feature set ID from a 256-bit array to a base 64 encoded value (or some other encoded value). For example, the IMS 210 transforms 0000 . . . 11 to a base 64 value of "D" (or a base ten value of "3"), and store the value "D" as the feature set ID.

As shown, in FIG. 2C, the digital feature activation system 200 also performs the step 250 of generating an access token and embedding the feature set ID into the access token. In particular, the IMS 210 generates an access token comprising a JSON web token (.jwt file). The IMS 210 embeds the feature set ID into the JSON web token. For example, in relation to the previous embodiment, the IMS 210 embeds the base 64 value "D" into an extension of the JSON web token.

In generating the access token, the IMS 210 can also indicate an expiration time. For example, in one or more embodiments, the IMS 210 sets an expiration time of 24 hours for generated access tokens. Accordingly, the client device 102 can utilize the access token and corresponding information for a period of 24 hours. After that time, the access token expires, and the user and/or the client device 102 must obtain a new access token.

In this manner, the digital feature activation system provides additional security over conventional digital licensing systems. Indeed, because of the complexity of obtaining, generating, managing, decrypting, and applying conventional licenses, digital licenses are typically valid for an extended period of time (e.g., months or years, depending on the life of a subscription). Accordingly, pirates that obtain a license can utilize the license for a significant time period. However, because one or more embodiments of the digital feature activation system utilize access tokens to pass a feature set ID (and do not utilize licenses), the digital feature activation system can utilize significantly shorter expiration times, making it even more difficult for pirates to obtain unauthorized access to software products for any meaningful period of time.

Moreover, as illustrated in FIG. 2C, the IMS 210 also performs the step 252 of sending the access token to the feature manager 206. The feature manager 206 performs the step 254 of identifying the feature set ID from the access token. For example, in relation to the previous example, the feature manager 206 identifies the base 64 value "D" (i.e., one form of the features set ID) embedded in the access token. Moreover, the feature manager 206 can decode the feature set ID (e.g., transform the base 64 value "D" into a bit array 0000 . . . 11).

As shown in FIG. 2C, the feature manager 206 also performs the step 256 of storing the feature set ID with the delegate GUID (or some other user identifier). As discussed in greater detail below in relation to FIGS. 4A-4B, by storing the feature set ID with the delegate GUID, the digital feature activation system 200 can easily remove or replace the feature set ID to provide individualized features to different users utilizing the client device 102.

Moreover, the application 208 can also perform the step 258 of sending a request for authorized features to the feature manager 206. In response, the feature manager 206 can perform the step 260 of performing a checksum and feature set ID validation. As used herein, the term "checksum value" refers to a block of digital data generated to detect errors or modifications in a digital item. In particular, the term "checksum value" includes digital data unique to a particular digital input (also referred to as a hash or hashsum). A checksum algorithm can generate a unique checksum value based on a particular data input (e.g., a master feature registry). Any modification to the digital input to the checksum algorithm (e.g., the master feature registry) results in generation of a different checksum value.

In particular, in one or more embodiments, the digital feature activation system generates the master feature registry (at step 218) and/or the feature set ID (at step 248) with one or more checksum values and/or a checksum algorithm. The feature manager 206 can then utilize the checksum values and/or checksum algorithm to verify that the master feature registry and/or feature set ID have not been altered, tampered with, or pirated.

In particular, in one or more embodiments, the server device(s) 104 (and/or the client device 102) utilize a checksum algorithm to generate a control checksum value unique to the master feature registry. Furthermore, the server device(s) 104 (and/or the client device 102) include an indication of the control checksum value unique to the master feature registry with the feature set ID in the access token. In performing step 260, the feature manager 206 can identify a test checksum value corresponding to the master feature registry as installed on the client device 102. Moreover, the feature manager 206 can compare the test checksum value with the control checksum value. If the master feature registry has been modified, tampered with, or pirated, the test checksum and the control checksum will not match, and the feature manager 206 will not return any authorized features. If the control checksum and the test checksum match, the feature manager 206 can continue analyzing the feature set ID and master feature registry (e.g., activate the authorized features of the software product(s)).

In addition to performing a checksum validation, the feature manager 206 can also perform a feature set ID validation. In particular, the feature manager 206 can determine whether the feature set ID has exceeded an expiration time. Indeed, as mentioned previously in relation to step 250, the digital feature activation system 200 can generate an access token with an expiration time. The feature manager 206 can determine whether the feature set ID embedded in the access token has surpassed the expiration time and expired. If the feature set ID has expired, the feature manager 206 will not return any authorized features. If the feature set ID has not expired, the feature manager 206 can continue analyzing the feature set ID and master feature registry (e.g., activate the authorized features of the software product(s)).

Indeed, upon performing the checksum and feature set ID validation, as illustrated in FIG. 2C, the feature manager 206 performs the steps 262, 264 of comparing the master feature registry and feature set ID and identifying authorized features. For example, the feature manager 206 can analyze each bit of the feature set ID and identify software product IDs the user is permitted to access. The feature manager 206 can then utilize the identified software products in conjunction with the master feature registry to determine authorized features.

For instance, if the feature set ID is 0000 . . . 11, the feature manager 206 can search the master feature registry for products that correspond to the affirmative bits of the feature set ID (i.e., the "11"). For instance, continuing the example from step 218 above, the feature manager 206 can search for the first software product ID 0000 . . . 10 and the second software product ID 0000 . . . 01 stored in the master feature registry (e.g., a product ID with an affirmative bit in the last digit and a product ID with an affirmative bit in the second to last digit).

Upon identifying the first and second software product IDs, the feature manager 206 can also identify authorized features based on the feature identifiers stored in the master feature registry. For example, continuing the example from step 218 above, the feature manager 206 utilizes the first product ID to identify feature identifiers "PhotoshopCC-Base-1.0" and "PhotoshopCC-Content-Aware-2.0" from the master feature registry. Moreover, utilizing the second product ID, the feature manager 206 can identify feature identifiers "InDesignCC-Base-1.0" and "InDesignCC-Uber-2" from the master feature registry. Moreover, the feature manager 206 can store "PhotoshopCC-Base-1.0," "PhotoshopCC-Content-Aware-2.0," "InDesignCC-Base-1.0," and "InDesignCC-Uber-2" as authorized features.

More specifically, in one or more embodiments, the feature manager 206 can utilize the following pseudocode to compare the master feature registry and feature set ID and identify authorized features:

1. Load Master Feature Registry into Master Register;
2. Retrieve Product IDs from Master Feature Registry and store in Master Index;
3. Hold an empty list called authorizedfeatures;
4. Iterate through Master Index list one by one, get the next item i from the list to sizeof(Master Index);
5. Load Feature Set ID (an array of 256 bits) into FS ID;
6. If a bitwise of FS ID AND corresponding bitwise from Master Register is true, then insert feature indicators from Master Register into authorizedfeatures, and continue until i=sizeof(MasterIndex); and
7. Return authorizedfeatures.

It will be appreciated that although the previous examples utilize feature set IDs, product IDs, and/or feature indicators of a particular form, the digital feature activation system 200 can utilize a variety of different forms to activate software products on a client device. For example, although exemplary product IDs and feature set IDs in previous examples were expressed in terms of "0" or "1" digits (e.g., a 256-bit array), the digital feature activation system 200 can also utilize other codes, characters, arrays, or items. Similarly, although feature indicators in previous examples were expressed as character strings, the digital feature activation system 200 can utilize other codes, characters, arrays, or items to indicate features.

As shown in FIG. 2C, the feature manager 206 also performs the step 266 of sending the authorized features to the application 208. Moreover, the application 208 can perform the step 268 of activating the authorized features in the application. In particular, the application 208 can determine whether authorized features are supported by the application 208. Moreover, the application 208 can activate or deactivate (enable or disable) supported features based on the authorized features provided from the feature manager 206.

Notably, from the perspective of a user, simply by downloading and launching the application 208, the method 300 automatically activates features specific to the user (i.e., specific to the software products purchased by the user) on the client device. The client device 102 does so without calling a licensing server, downloading a license, de-encrypting a license, applying a license, or storing a license. Rather, by utilizing an access token embedded with a feature set ID, the client device activates software features utilizing feature data (i.e., a master feature registry and feature set ID) stored in memory of the client device.

As mentioned previously, the digital feature activation system can also simplify adding, removing, or otherwise updating software products and features. In particular, because one or more embodiments of the digital feature activation system activate software products on a client device utilizing a master feature registry and feature set ID stored in memory of a local application, the digital feature activation system can refresh software products and features by simply updating the master feature registry. Specifically, the digital feature activation system can update the master feature registry and download the master feature registry to the client device at the time of installing the new software products and/or features. The client device can then identify and activate the new features in relation to installed new software products based on a feature set ID embedded in a new access token.

In particular, FIG. 3A illustrates a digital feature activation system 300 activating new software products and new features on a client device utilizing an updated master feature registry, a new feature set ID, and/or a new access token. In particular, as shown in FIGS. 3A-3C the digital feature activation system 300 causes steps 302-346 to be implemented by the client device 102 (comprising the feature manager 206 and the application 208) and the server device(s) 104 (comprising the IMS 210, the user profile manager 212, and the feature registry manager 214).

As illustrated in FIG. 3A, the digital feature activation system 300 causes the feature registry manager 214 to perform the step 302 of the receiving one or more new features and/or one or more new software products. As used herein, the term "new" as used in relation to features or software products, refers to a feature or software product not previously available in the same form. For example, the term "new" software product refers to an added software product (that was not previously available at all) or a modified software product (that was not previously available as modified). Similarly, the term "new" feature refers to an added feature (that was not previously available at all) or a modified feature (that was not previously available as modified).

The step 302 can also include receiving a deletion of a software product and/or feature. Utilizing the steps outlined below, the digital feature activation system can also remote (e.g., deactivate) a software product and/or feature. Thus, although many steps below are described in relation to new products and new features, it will be appreciated that the steps can also be performed in relation to deleted software products and/or features.

As mentioned previously, in one or more embodiments, the feature registry manager 214 provides a feature registry console with a user interface that allows software developers to declare or define software product IDs and corresponding features (e.g., feature indicators). The feature registry manager 214 can also receive modifications to software product IDs and/or corresponding features via the feature registry console and corresponding user interface. Thus, at any time, software developers can interact with the feature registry manager and provide updates to software products and/or features. Moreover, as outlined in the subsequent steps, the digital activation manager can then reflect the updates on software products installed on client devices. In this manner, one or more embodiments of the digital feature activation system can enable software developers to make updates to software products and/or features in real time, significantly simplifying and streamlining the laborious process of updating licenses, licensing servers, and processes in conventional digital licensing systems.

For example, as illustrated in FIG. 3A, upon receiving new (or deleted) features and/or new (or deleted) software product(s), the feature registry manager 214 performs the steps 304, 306 of generating an updated master feature registry and sending the updated master feature registry to the IMS 210. As discussed in relation to the master feature registry of FIG. 2A (i.e., step 218), the feature registry manager 214 can generate an updated master feature registry that lists software products and corresponding features (e.g., product IDs and feature indicators). Moreover, the IMS 210 performs the step 308 of storing the updated master feature registry (i.e., replace the master feature registry stored in step 222).

As mentioned previously, the digital feature activation system can disseminate updated master feature registries in conjunction with installing software products and/or features. Thus, as shown in FIG. 3A, the application 208 performs the step 310 of installing new feature(s) and/or new software product(s). For example, the step 310 includes installing an update to the application 208 that includes one or more additional or modified features.

In addition, upon installing the new feature(s) and/or new software product(s), the user profile manager 212 performs the step 310a of updating users and corresponding software products. For example, the user profile manager 212 updates a database that associates a user profile corresponding to the user of the client device 102 with the new feature(s) and/or new software product(s) installed on the client device 102.

Furthermore, upon installing the new feature(s) and/or new software product(s), the IMS 210 performs the step 312 of providing the updated master feature registry to the application 208. Moreover, the application 208 performs the step 314 of providing the updated master feature registry to the feature manager 206. In addition, the feature manager 206 performs the step 316 of storing the updated master feature registry.

Once the updated master feature registry is installed on a client device, the digital feature activation system can initiate a new software product, obtain a new access token and new feature set ID, and activate the new features of the new software product. In particular, FIG. 3B illustrates the application 208 performing the step 318 of initiating the new software product(s) (e.g., the updated application 208). Upon initiating the new software product(s), the feature manager 206 performs the step 320 of sending activation credentials (i.e., delegate GUID, device token, user name and/or password) to the IMS 210. The IMS 210 (e.g., via an authentication server) performs the step 322 of authorizing the user.

In response to authorizing the user, the IMS 210 then obtains software product(s) corresponding to the user. Specifically, the IMS 210 performs the step 324 of requesting software product(s) corresponding to the user from the user profile manager 212, the user profile manager 212 performs the step 326 of identifying software product(s) corresponding to the user (i.e., including the new software product(s)), and the user profile manager 212 performs the step 328 of sending an indication of the software product(s) (including the new software product(s)) to the IMS 210.

With the software product(s) from the user profile manager 212 (including the new software product(s)), the IMS 210 performs the step 330 of generating a new feature set ID. In particular, the IMS 210 can generate a new feature set ID that points to the new software product(s) and new feature(s). For example, in the event the new software product(s) include an added software product, the IMS 210 generates a new feature set ID based on a new product ID corresponding to the new software product. The IMS 210 also performs the step 332 of generating a new access token and embedding the new feature set ID into the new access token. Moreover, the IMS 210 performs the step 334 of sending the new access token to the feature manager 206.

With the new access token, the client device 102 identifies the new feature set ID and utilize the new feature set ID in conjunction with the updated master feature registry to activate features the user is permitted to access (including the new feature(s)). In particular, as shown in FIG. 3C, the feature manager 206 performs the steps 336, 338, 340, 342 of identifying the new feature set ID from the new access token, storing the new feature set ID, comparing the updated master feature registry and the new feature set ID, and identifying new authorized features. Moreover, the feature manager 206 performs the step 344 of sending the new authorized features to the application 208, and the application 208 performs the step 346 of activating the new feature(s) in the application.

Notably, the digital feature activation system automatically activates new features on the client device 102 in response to receiving new features and/or software products (at step 302). Thus, from the perspective of a software developer interacting with the feature registry manager 214, upon providing new features and/or new software products, the new features and/or new software products are automatically activated at end user devices. The software developer need not adjust metadata corresponding to one or more licenses or licensing servers or otherwise engage in operational procedures required to update licenses, products, and features in conventional digital licensing systems.

As mentioned previously, the digital feature activation system also makes it possible to activate user specific features for multiple users of a single client device. In particular, the digital feature activation system allows multiple users to utilize the same computing machine to access software products with features unique to each particular user. Because traditional digital licensing systems store licenses on the device, different users of the client device have access to the same software products and features. In contrast, the digital feature activation system can activate user-specific features on the same client device.

Specifically, in one or more embodiments, upon detecting that a user has logged out of an account, the digital feature activation system deletes feature data (e.g., a feature set ID and/or authorized features) stored in memory, and thus deactivates all features associated with the user. The digital feature activation system then obtains an access token in relation to a second user that contains a new feature set ID specific to the second user. In this manner, the digital feature activation system can activate the features specific to the second user of the same client device.

For example, FIGS. 4A-4C illustrate a digital feature activation system 400 activating user-specific features utilizing a feature set ID embedded in an access token. In particular, FIGS. 4A-4C illustrate the digital feature activation system 400 performing the steps 402-432 via the client device 102 (comprising the feature manager 206 and the application 208) and the server device(s) 104 (comprising the IMS 210, the user profile manager 212, and the feature registry manager 214).

More specifically, FIG. 4A illustrates that the feature manager 206 performs the step 402 of detecting a user sign out. In particular, the step 402 can comprise detecting user sign out of an account associated with the user. For example, the step 402 can comprise detecting a user signing out of an account with the IMS 210 (and/or the user profile manager 212).

Indeed, as discussed previously, a user of the client device 102 can sign in to an account managed by the server device(s) 104. For example, as mentioned above (e.g., in relation to steps 112-114, 236-238, and 320-322) the user signs in to an account managed by the server device(s) 104 utilizing verifying credentials such as a username and password and/or delegate GUID. Accordingly, the server device(s) 104 can also determine a user signing out of an account managed by the server device(s) 104.

A user can sign out in a variety of forms. For example, the digital feature activation system can provide a user interface comprising a sign out element. Upon user interaction with the sign out element, the digital feature activation system detects that the user has signed out of an account corresponding to the application 208. Similarly, the digital feature activation system can automatically sign a user out of an account after passage of a certain amount of time, or upon signing out of a user account on the client device 102.

Indeed, in one or more embodiments, the client device 102 itself can comprise one or more user accounts. For example, the client device 102 can comprise a computing device partitioned into various accounts associated with different users. A user of the client device can sign out of the client device 102, and the digital feature activation system can detect that the user has signed out of an account associated with the server device(s) 104.

Upon detecting a user sign out, as shown in FIG. 4A, the feature manager 206 performs the step 404 of clearing feature data from memory. In particular, in one or more embodiments, the feature manager 206 clears a feature set ID and/or a list of authorized features from memory. By clearing the feature set ID and/or the list of authorized features, the feature manager 206 disables (or de-activates) features of software products installed on the client device 102.

In one or more embodiments, the step 404 also comprises clearing a delegate GUID or other activation credentials. For example, the step 404 can include clearing a delegate GUID from memory such that the client device 102 can no longer provide the delegate GUID to the server device(s) 104 and obtain authorization utilizing the delegate GUID.

In one or more embodiments, the step 404 does not include deleting the master feature registry; rather the digital feature activation system leaves the master feature registry on the client device 102. Indeed, in one or more embodiments, the master feature registry does not contain information specific to a particular user, but indicates the features corresponding to all, or one or more, supported software products. Thus, in one or more embodiments, the digital feature activation system provides the master feature registry to client devices and leaves the master feature registry in place upon sign out of any particular user (so as to avoid having to re-download the master feature registry for another user).

Upon clearing feature data from memory, the digital feature activation system can await a sign in by a second user. Moreover, upon a sign in by the second user, the digital feature activation system can identify and activate features specific to the second user. For example, as shown in FIG. 4A, after cleaning feature data from memory, the application 208 performs the step 406 of sending verification credentials of the second user (e.g., a username and/or password corresponding to the second user) to the IMS 210. As described above, the digital feature activation system performs step 406 in response to the second user activating one or more software products. For example, if the second user initiates the application 208, the digital feature activation system requests verification credentials and sends the verification credentials to the IMS 210.

As shown, the IMS 210 performs the step 408 of authorizing the second user. In particular, as mentioned above, the step 408 comprises logging the second user into an account associated with the user. Upon authorizing the user, the IMS 210 performs the step 410 of requesting software product(s) corresponding to the second user from the user profile manager 212. Moreover, the user profile manager 212 performs the steps 412, 414 of identifying software product(s) corresponding to the second user and sending the software product(s) corresponding to the second user to the IMS 210.

As illustrated in FIG. 4A, the IMS 210 performs the step 416 of generating a second feature set ID. Moreover, the IMS 210 performs the step 418 of generating a second access token and embedding the second feature set ID into the second access token. Furthermore, as shown, the IMS 210 performs the step 420 of sending the second access token to the feature manager 206.

The feature manager 206 can then utilize the second access token and embedded second feature set ID to activate features corresponding to the second user. In particular, as shown in FIG. 4B, the feature manager 206 performs the steps 422, 424, 426, 428, and 430 of identifying the second feature set ID from the second access token, storing the second feature set ID, comparing the master feature registry and the second feature set ID, identifying second authorized features, and sending the second authorized features to the application 208. Moreover, the application 208 can perform the step 432 of activating the second authorized features in the application 208.

Notably, the digital feature activation system enables the second user to access features specific to the second user from the same device as the original user. Indeed, upon logging in, one or more embodiments of the digital feature activation system provides a new access token with a new feature set ID specific to the second user, which causes the client device to activate features specific to the second user.

Thus, for example, a first user may have purchased a software product comprising a basic version of the ADOBE® PHOTOSHOP® program with a more limited first set of features while the second user had purchased a second software product comprising an advanced version of ADOBE® PHOTOSHOP® program with a more robust second set of features. The second user can utilize the same computing device as the first user, and, by providing verification credentials, activate the more robust second set of features on the same computing device.

Although illustrated in relation to particular components performing particular steps, it will be appreciated that the methods described in relation to FIGS. 1-4B may be performed with less or more steps/acts or the steps/acts may be performed in differing orders by different components. Additionally, the steps/acts described herein may be repeated or performed in parallel with one another or in parallel with different instances of the same or similar steps/acts.

Turning now to FIG. 5, additional detail is provided regarding components and capabilities of one embodiment of the digital feature activation system. In particular, FIG. 5 illustrates an embodiment of an exemplary digital feature activation system 500 (any of digital feature activation systems 100, 200, 300, and 400 referenced above). As shown, the digital feature activation system 500 may include, but is not limited to a client device 502 (e.g., the client device 102) and a server 504 (e.g., the server device(s) 104). Moreover, as shown, the client device 502 includes a download manager 506, a client application 508 (comprising a feature manager 508a and a feature activation engine 508b) and a device storage manager 510 (comprising credentials 510a, user profile 510b, feature data 510c, and master feature registry 510d). Furthermore, as shown, the server 504 includes a feature registry manager 512, a software download facility 514, a user authentication engine 516, a user profile manager 518, an information management system 520 (comprising a feature set ID generator 520a and an access token manager 520b) and a server storage manager 522 (comprising user profile data 522a and master feature registry 522b).

As just mentioned, and as illustrated in FIG. 5, the digital feature activation system 500 includes the download manager 506. The download manager 506 can receive, download, and/or install one or more digital items. In particular, the download manager 506 can download and install one or more software products (e.g., the client application 508 or other software products) from the server 504 (e.g., via the software download facility 514). Furthermore, the download manager 506 can download one or more master feature registries. For example, in conjunction with downloading a software product, the download manager 506 can download a master feature registry.

As shown in FIG. 5, the client device 502 also includes the client application 508. The client application 508 can comprise any of one or more software products (including an individual software product or suite software product).

The client application 508 is capable of performing a variety of features that can be enabled or disabled (i.e., activated or deactivated).

As illustrated in FIG. 5, the client application 508 includes the feature manager 508a (e.g., the feature manager 206). The feature manager 508a can obtain, identify, and/or manage one or more features. In particular, the feature manager 508a can identify, obtain, and decode one or more feature set IDs (e.g., feature set IDs embedded in access tokens). Moreover, the feature manager 508a can compare feature set IDs with a master feature registry (e.g., the master feature registry 510d) and identify one or more features a user is permitted to access (i.e., authorized features).

The feature manager 508a can also send and receive information as necessary to obtain access to one or more features. For example, the feature manager 508a can send verification credentials (e.g., to the information management system 520 and/or the user authentication engine 516) to obtain one or more access tokens containing a feature set ID.

The feature manager 508a can also delete feature data (e.g., feature data 510c). For example, upon detecting sign out of a user, the feature manager 508a can delete feature set IDs and/or authorized features. Similarly, the feature manager 508a can delete activation credentials utilized to access a feature set ID, such as a delegate GUID.

The feature manager 508a can also perform a checksum validation and/or feature set ID validation. As described above, the feature manager 508a can identify a checksum value of a master feature registry and determine whether the checksum corresponds to a corresponding value of a feature set ID and/or access token. Moreover, the feature manager 508a can determine whether a feature set ID has expired.

In addition to the feature manager 508a, the client application 508 also includes the feature activation engine 508b. The feature activation engine 508b can turn on, activate, and/or enable one or more features of the client application 508. Similarly, the feature activation engine 508b can turn off, deactivate, and/or disable one or more features of the client application 508. For example, the feature activation engine 508b can obtain authorized features (via the feature manager 508a), determine which of the authorized features correspond to the client application 508, and activate the authorized features.

As shown in FIG. 5, the client device 502 also includes the device storage manager 510. The device storage manager 510 maintains data to perform the functions of the digital feature activation system 500. As illustrated, the device storage manager 510 includes credentials 510a (e.g., activation credentials, such as username and/or password, delegate GUID, or device tokens), user profile 510b (e.g., information regarding a user or user account), feature data 510c (feature set IDs or authorized features), and master feature registry 510d.

In addition, as mentioned above and as illustrated in FIG. 5, the digital feature activation system 500 also includes the server 504. Moreover, the server 504 includes the feature registry manager 512 (e.g., the feature registry manager 214). The feature registry manager 512 can receive and/or identify one or more software products and one or more features corresponding to each software product. In particular, as described above, the feature registry manager 512 can receive product IDs and feature identifiers. Moreover, the feature registry manager 512 can create, generate, and/or compile a master feature registry. As discussed above, the feature registry manager 512 can generate a master feature registry comprising a list of software product IDs and corresponding feature identifiers. Moreover, the feature registry manager 512 can also generate updated master feature registries. For example, as mentioned above, the feature registry manager 512 can receive new software products and/or new features and generate an updated master feature registry.

In addition to the feature registry manager 512, as illustrated in FIG. 5, the server 504 can also include the software download facility 514. The software download facility 514 can send, provide, download, and/or install one or more software products. In particular, the software download facility 514 can provide the client application 508 for installation on the client device 502. Moreover, the software download facility 514 can provide, download, and/or install updates to software products (e.g., updates to the client application 508 installed on the client device 502).

In addition, the software download facility 514 can also download a master feature registry. For example, in conjunction with downloading one or more software products to the client device 502, the software download facility 514 can provide a master feature registry. Moreover, the software download facility 514 can provide an updated master feature registry in conjunction with downloading a new software product.

As shown in FIG. 5, the server 504 also includes the user authentication engine 516. The user authentication engine 516 can authenticate, sign in, log in, and/or identify one or more users and/or client devices. In particular, the user authentication engine 516 can receive verification credentials from the client device 502 and authenticate and/or identify the user of the client device 502. The user authentication engine 516 can authenticate or sign on a user with regard to a plurality of software products (e.g., via single sign on). For example, upon the client device 502 providing verification credentials in relation to an account associated with a first software product, the user authentication engine 516 authenticates (e.g., sign on) the client device 502 across multiple software products.

Moreover, as illustrated in FIG. 5, the server 504 also includes the user profile manager 518 (e.g., the user profile manager 212). The user profile manager 518 can create, manage, modify, and/or delete one or more user profiles or accounts. In particular, the user profile manager 518 can manage a database (e.g., user profile data 522a) that associates users (e.g., user profiles and/or user accounts) with information corresponding to the user (e.g., software products purchased by the user, contact information, delegate GUID, or other information).

As illustrated in FIG. 5, the server 504 also includes the information management system 520. The information management system 520 can send, receive, and manage digital information on behalf of the server 504. In particular, the information management system 520 receive calls from the client device (e.g., the feature manager 508a), provide information to the client device 502, coordinate authentication of the client device 502 (e.g., via the user authentication engine 516), and coordinate with other components of the server 504.

Furthermore, as shown in FIG. 5, the information management system 520 includes a feature set ID generator 520a. The feature set ID generator 520a can create, generate, and/or encode a feature set ID. For example, the feature set ID generator 520a can identify (e.g., via the user profile manager 518) software products corresponding to a user of the client device 502 and generate a feature set ID that identifies the software products. Specifically, in one or more embodiments, the feature set ID generator 520a creates a feature set ID by encoding product IDs of the software products corresponding to the user.

In addition to the feature set ID generator 520a, as shown in FIG. 5, the information management system 520 also includes the access token manager 520b. The access token manager 520b can create, generate, provide, and/or encode an access token. In particular, the access token manager 520b can generate an access token that includes a feature set ID. Specifically, the access token manager 520b can encode a feature set ID from the feature set ID generator 520a into an access token and provide the access token to the client device 502.

In addition to embedding a feature set ID, the access token manager 520b can generate an access code that allows a user of the client device 502 to access information stored on the server 504. For example, in one or more embodiments, the server 504 stores digital content (e.g., digital media, digital images, digital video, or fonts). The access token can provide access to the digital content or other resources hosted on the server 504.

The access token manager 520b can also create and/or embed an expiration time in an access token. For example, the access token manager 520b can embed an expiration time such that the client device 102 cannot utilize an access token and/or feature set ID after the access token has expired.

Moreover, as illustrated in FIG. 5, the server 504 also includes the server storage manager 522. The server storage manager 522 maintains data as necessary to perform the functions of the digital feature activation system 500. As illustrated, the server storage manager 522 includes user profile data 522a (e.g., software products a user is permitted to access, user accounts, and other user information) and master feature registry 522b.

Each of the components 502-522 of the digital feature activation system 500 and their corresponding elements (as shown in FIG. 5) may be in communication with one another using any suitable communication technologies. It will be recognized that although components 502-522 of the digital feature activation system 500 and their corresponding elements are shown to be separate in FIG. 5, any of components 502-522 and their corresponding elements may be combined into fewer components, such as into a single facility or module, divided into more components, or configured into different components as may serve a particular embodiment.

The components 502-522 of the digital feature activation system 500 and their corresponding elements can comprise software, hardware, or both. For example, the components 502-522 and their corresponding elements can comprise one or more instructions stored on a computer-readable storage medium and executable by processors of one or more computing devices. When executed by the one or more processors, the computer-executable instructions of the digital feature activation system 500 can cause a client device and/or a server device to perform the methods described herein. Alternatively, the components 502-522 and their corresponding elements can comprise hardware, such as a special purpose processing device to perform a certain function or group of functions. Additionally, the components 502-522 and their corresponding elements can comprise a combination of computer-executable instructions and hardware.

Furthermore, the components 502-522 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-522 may be implemented as a stand-alone application, such as a desktop or mobile application. Furthermore, the components 502-522 may be implemented as one or more web-based applications hosted on a remote server. The components 502-522 may also be implemented in a suit of mobile device applications or "apps." To illustrate, the components 502-522 may be implemented in an application, including but not limited to ADOBE® CREATIVE CLOUD® software, ADOBE PHOTOSHOP® software, ADOBE® INDESIGN® software, ADOBE® ILLUSTRATOR® software, ADOBE® LIGHTROOM® software, ADOBE® MARKETING® CLOUD® software, ADOBE ANALYTICS® software, ADOBE® CAMPAIGN® software, ADOBE® SOCIAL® software, or ADOBE® TARGET® software or any suite combining such software programs. "ADOBE," "CREATIVE CLOUD," "PHOTOSHOP," "INDESIGN," ILLUSTRATOR, "LIGHTROOM," "MARKETING CLOUD," "ANALYTICS," "CAMPAIGN," "SOCIAL" and "TARGET" are either registered trademarks or trademarks of Adobe Systems Incorporated in the United States and/or other countries.

FIG. 6 illustrates a schematic diagram of one embodiment of an exemplary environment 600 in which the digital feature activation system 500 can operate. In one or more embodiments, the exemplary environment 600 includes one or more client devices 602a, 602b, . . . 602n, a network 604, and server(s) 606. The network 604 may be any suitable network over which the computing devices can communicate. Example networks are discussed in more detail below with regard to FIG. 10.

As illustrated in FIG. 6, the environment 600 may include client devices 602a-602n. The client devices 602a-602n may comprise any computing device (e.g., the client device 102 and the client device 502). For instance, in one or more embodiments, one or more of the client devices 602a-602n comprise any computing device described below in relation to FIG. 10.

In addition, the environment 600 may also include the server(s) 606 (e.g., the server device(s) 104 and the server 504). The server(s) 606 may generate, store, receive, and transmit any type of data, including credentials 510a, user profile 510b, feature data 510c, master feature registry 510d, user profile data 522a, or master feature registry 522b. For example, the server(s) 606 may transmit data to a client device, such as the client device 602a. The server(s) 606 can also transmit electronic messages between one or more users of the environment 600. In one example embodiment, the server(s) 606 comprise a content server. The server(s) 606 can also comprise a communication server or a web-hosting server. Additional details regarding the server(s) 606 will be discussed below with respect to FIG. 10.

As illustrated, in one or more embodiments, the server(s) 606 can include a portion of the digital feature activation system 500. In particular, the digital feature activation system 500 can comprise an application running on the server(s) 606 or a portion of a software application that can be downloaded from the server(s) 606. For example, the digital feature activation system 500 can include a web hosting application that allows the client devices 602a-602n to interact with content hosted at the server(s) 606. To illustrate, in one or more embodiments of the exemplary environment 600, one or more client devices 602a-602n can access a webpage supported by the server(s) 606. In particular, the client device 602a can run an application to allow a user to access, view, and/or interact with a webpage or website hosted at the server(s) 606.

Although FIG. 6 illustrates a particular arrangement of the client devices 602a-602n, the network 604, and the server(s) 606, various additional arrangements are possible. For example, while FIG. 6 illustrates multiple separate client devices 602a-602n communicating with the server(s) 606 via the network 604, in one or more embodiments a single client device may communicate directly with the server(s) 606, bypassing the network 604.

Similarly, although the environment 600 of FIG. 6 is depicted as having various components, the environment 600 may have additional or alternative components. For example, the digital feature activation system 500 can be implemented on a single computing device. In particular, the digital feature activation system 500 may be implemented in whole by the client device 602a or the digital feature activation system 500 may be implemented in whole by the server(s) 606. Alternatively, the digital feature activation system 500 may be implemented across multiple devices or components (e.g., utilizing the client devices 602a-602n and the server(s) 606).

By way of example, in one or more embodiments, the client device 602a sends a request to the server(s) 606 to utilize a software product installed on the client device 602a (e.g., via the feature manager 508a). The server(s) 606 authorize (e.g., identify) a user of the client device 602a (e.g., via the user authentication engine 516) and generate a feature set ID that indicates the software products (and features) the user of the client device 602a is permitted to access (e.g., via the user profile manager 518 and the feature set ID generator 520a). The server(s) 606 embed the feature set ID into an access token (e.g., via the access token manager 520b) and send the access token to the client device 602a (e.g., via the information management system 520). The client device 602a identifies the feature set ID in the access token and compares the feature set ID with a master feature registry stored on the client device 602a (e.g., via the feature manager 508a). In particular, the client device 602a compares the feature set ID with a master feature registry downloaded from the server(s) 606 in conjunction with downloading the software product. Utilizing the feature set ID and the master feature registry, the client device 602a identifies the features the user of the client device 602a is permitted to utilize (i.e., authorized features) and activates the authorized features in relation to the software product (e.g., via the feature activation engine 508b).

Figure 7:
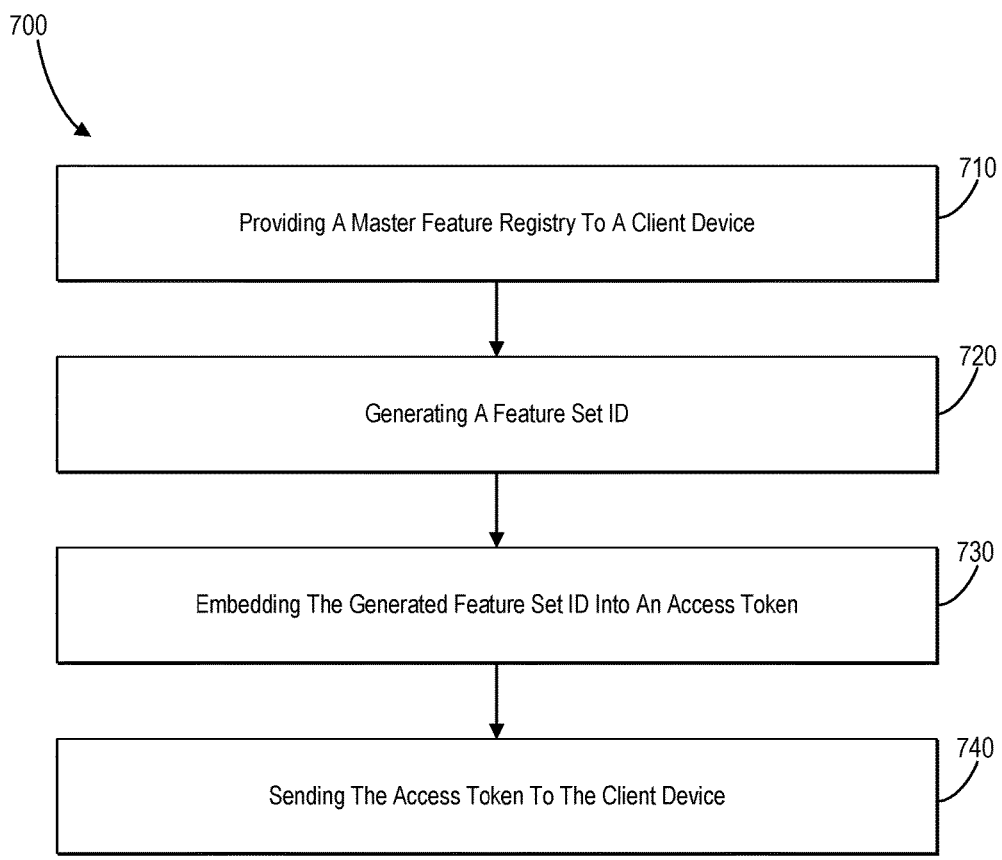
FIG. 7 illustrates a flowchart of a series of acts in a method of activating features of a software product in accordance with one or more embodiments.
Figure 8:
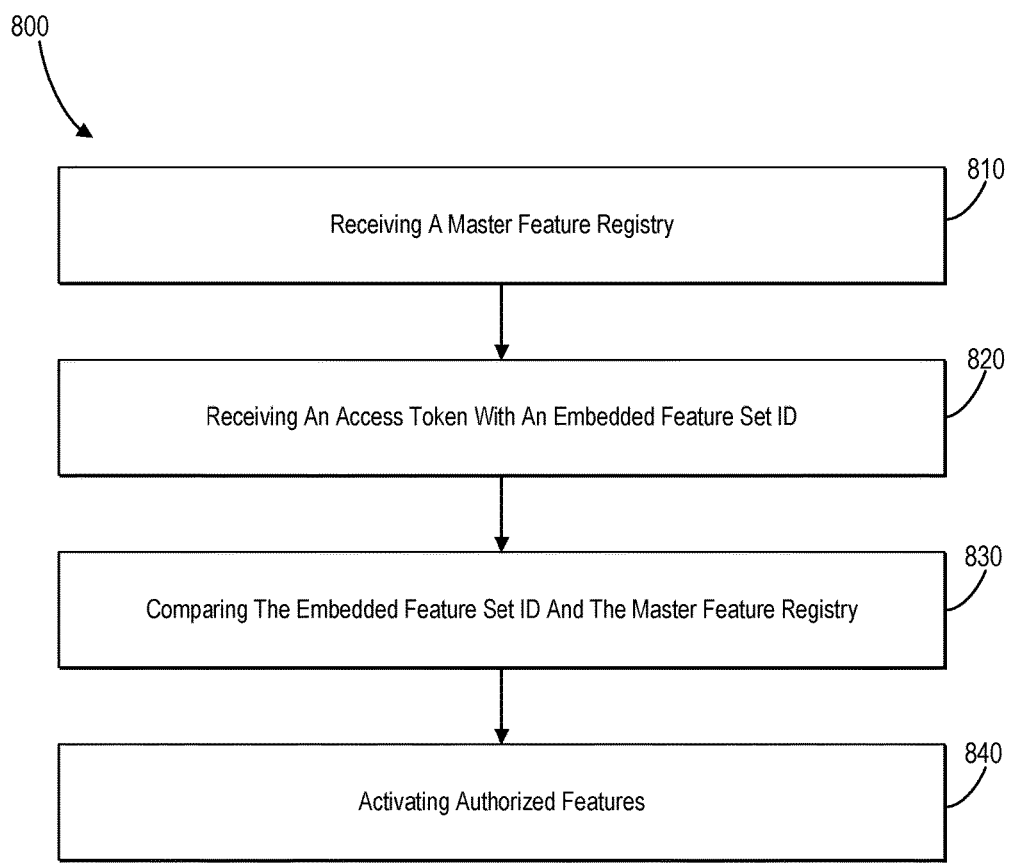
FIG. 8 illustrates a flowchart of a series of acts in another method of activating features of a software product in accordance with one or more embodiments.
Figure 9:
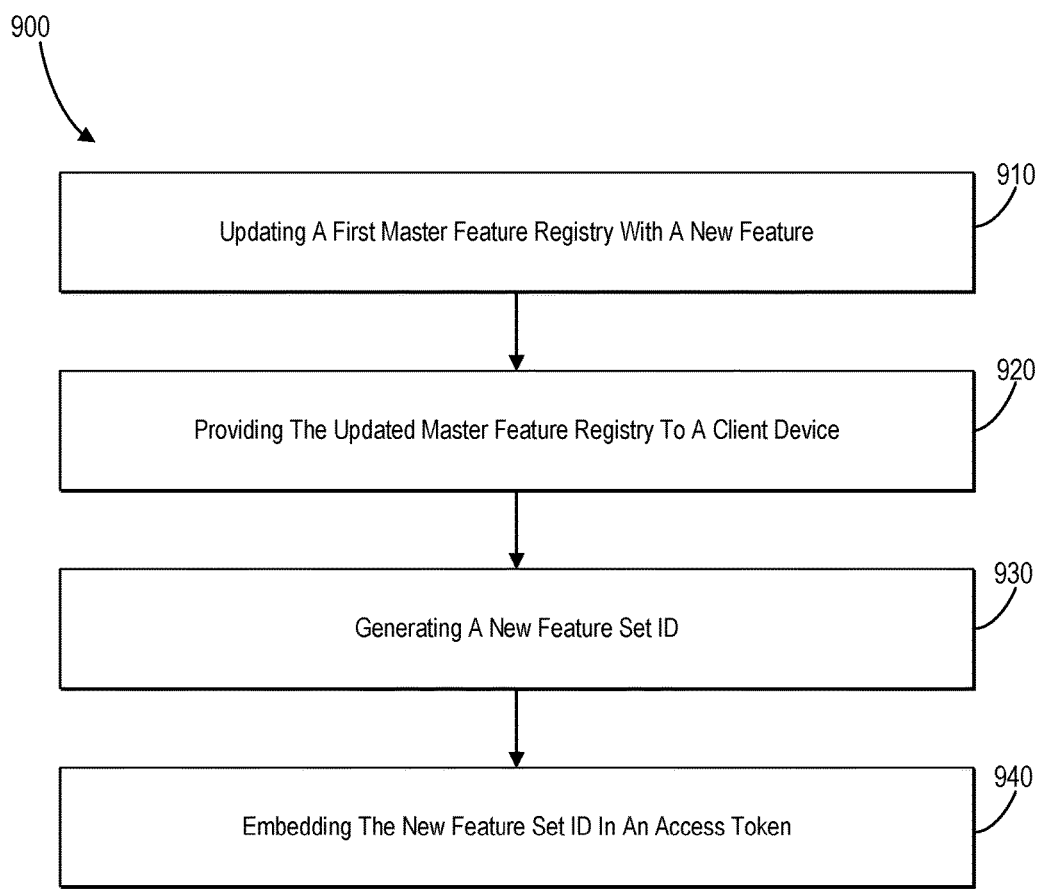
FIG. 9 illustrates a flowchart of a series of acts in another method of activating features of a software product in accordance with one or more embodiments.

FIGS. 1A-6, the corresponding text, and the examples, provide a number of different systems and devices that activate features of software products utilizing an access token embedded with a feature set ID. In addition to the foregoing, embodiments can also be described in terms of flowcharts comprising acts and steps in a method for accomplishing a particular result. For example, FIGS. 7-9 illustrate flowcharts of exemplary methods in accordance with one or more embodiments. The methods described in relation to FIGS. 7-9 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 of activating features of software products utilizing an access token embedded with a feature set ID. In one or more embodiments, the method 700 is performed in a digital medium environment that includes the digital feature activation system 500. The method 700 is intended to be illustrative of one or more methods in accordance with the present disclosure, and is not intended to limit potential embodiments. Alternative embodiments can include additional, fewer, or different steps than those articulated in FIG. 7.

As illustrated in FIG. 7, the method 700 includes an act 710 of providing a master feature registry to a client device. In particular, the act 710 can include providing, by one or more servers, a master feature registry to a client device of a user in conjunction with downloading a software product to the client device, wherein the master feature registry lists features of a plurality of software products and wherein the plurality of software products comprises the software product.

As shown in FIG. 7, the method 700 also includes an act 720 of generating a feature set ID. In particular, the act 720 can include generating, by the one or more servers, a feature set ID that indicates the features of the software product that the user of the client device is permitted to access. For example, in one or more embodiments, the act 720 includes determining, from a user profile of the user, that the user is permitted to access the software product; and encoding a software product ID corresponding to the software product into the feature set ID.

Furthermore, as shown in FIG. 7, the method 700 also includes an act 730 of embedding the generated feature set ID into an access token. In particular, the act 730 can include embedding, by the one or more servers, the generated feature set ID into an access token. For example, the act 730 can comprise embedding the generated feature set ID into an access token comprising a json web token. In addition, in one or more embodiments, the act 730 includes embedding an expiration time into the access token such that the client device will no longer activate the features of the software product utilizing the feature set ID after the expiration time.

Moreover, as illustrated in FIG. 7, the method 700 also includes an act 740 of sending the access token to the client device. In particular, the act 740 can include sending, by the one or more servers, the access token with the embedded feature set ID to the client device in response to authenticating the user such that the client device compares the master feature registry to the feature set ID and, based on the comparison, activates the features of the software product that the user of the client device is permitted to access.

In one or more embodiments, the method 700 also includes authenticating the user based on a verification credential received from the client device. In addition, the method 700 can also include receiving, from the client device, a second verification credential corresponding to a second user; and generating a second feature set ID based on the second user and a second software product associated with the second user. Furthermore, the method 700 can also include embedding the second feature set ID corresponding to the second software product into a second access token; and sending the second access token with the embedded second feature set ID to the client device such that the client device compares the master feature registry to the second feature set ID, activates second features of the second software product based on the comparison, and prohibits access to the features of the software product.

Moreover, in one or more embodiments, the method 700 includes updating the master file registry to list a new feature of a new software product; providing the updated master file registry to the client device in conjunction with downloading the new software product to the client device; and generating a new feature set ID based on the new software product. Moreover, the method 700 can include embedding the new feature set ID corresponding to the new software product into a third access token. In addition, the method 700 can also include sending the third access token with the embedded updated feature set ID to the client device such that the client device can compare the updated master feature registry to the new feature set ID embedded into the third access token and, based on the comparison, activate the new feature of the new software product.

In addition, FIG. 8 illustrates another flowchart of a series of acts in a method 800 of activating features of software products utilizing an access token embedded with a feature set ID. As shown, the method 800 includes an act 810 of receiving a master feature registry. In particular, the act 810 can include receiving, from one or more servers, a master feature registry in conjunction with downloading a software product from the one or more servers, wherein the master feature registry lists a plurality of features of the software product.

In addition, as illustrated in FIG. 8, the method 800 also includes an act 820 of receiving an access token with an embedded feature set ID. In particular, the act 820 can include, in response to sending an authentication request to the one or more servers, receiving from the one or more servers an access token, wherein the access token comprises an embedded feature set ID corresponding to the software product. In addition, the act 820 can comprise decoding the embedded feature set ID to identify one or more software products and/or features referenced in the embedded feature set ID.

As illustrated in FIG. 8, the method 800 also includes an act 830 of comparing the embedded feature set ID and the master feature registry. In particular, the act 830 can include comparing the embedded feature set ID from the access token and the master feature registry received from the one or more servers to identify authorized features. For example, in one or more embodiments, the method 800 includes comparing a feature set ID with product IDs embedded in a master feature registry; and identifying features (e.g., feature identifiers) based on the software product IDs. In addition, inn one or more embodiments, the act 830 includes comparing a checksum value of the master feature registry with a corresponding checksum value of the feature set ID; and activating the authorized features of the software product on the client device based on a determination that the checksum value of the master feature registry matches the corresponding checksum As shown in FIG. 8, the method 800 also includes an act 840 of activating authorized features. In particular, the act 840 can include based on the comparison of the feature set ID and the master feature registry, activating the authorized features of the software product on the client device. For example, in one or more embodiments, the act 840 comprises activating the authorized features without sending a request to a licensing server.

In addition, the method 800 can also include receiving an updated master feature registry in conjunction with downloading a new software product having a new feature; and in response to sending an additional authentication request to the one or more servers, receiving from the one or more severs a second access token, wherein the second access token comprises an embedded second feature set ID corresponding to the new software product. Moreover, in one or more embodiments, the method 800 includes comparing the embedded second feature set ID corresponding to the new software product with the updated master feature registry received from the one or more servers to identify second authorized features, wherein the second authorized features comprise the new feature; and activating the second authorized features of the second software product on the client device.

Moreover, in one or more embodiments, the method 800 also includes in response to the user signing out of an account, clearing the feature set ID such that the authorized features are no longer activated. In addition, the method 800 can also include in response to a second user signing into an account on the client device, sending verification credentials to the one or more servers; in response to sending the verification credentials, receiving a third access token, wherein the third access token comprises an embedded third feature set ID corresponding to a third software product; comparing the embedded third feature set ID from the third access token and the master feature registry received from the one or more servers to identify a third licensed feature set; and authorizing the third feature set in relation to the third software product.

Moreover, FIG. 9 illustrates another flowchart of a series of acts in a method 900 of activating features of software products utilizing an access token embedded with a feature set ID. As shown, the method 900 includes an act 910 of updating a first master feature registry with a new feature. In particular, the act 910 includes updating a first master feature registry listing features of a plurality of software products by adding an indication of a new feature corresponding to a new software product.

As illustrated in FIG. 9, the method 900 also includes an act 920 of providing the updated master feature registry to a client device. In particular, the act 920 includes providing the updated master feature registry to a client device of a user to replace the first master feature registry previously downloaded on the client device.

Furthermore, as shown in FIG. 9, the method 900 also includes an act 930 of generating a new feature set ID. In particular, the act 930 includes generating a new feature set ID that indicates the new software product that the user of the client device is permitted to access.

Moreover, as shown in FIG. 9, the method 900 also includes an act 940 of embedding the new feature set ID in an access token. In particular, the act 940 includes embedding the new feature set ID corresponding to the new software product in an access token such that the client device, upon receiving the access token replaces an original feature set ID on the client device with the new feature set ID, and activates the new feature corresponding to the new software product by comparing the new feature set ID with the updated master product registry on the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
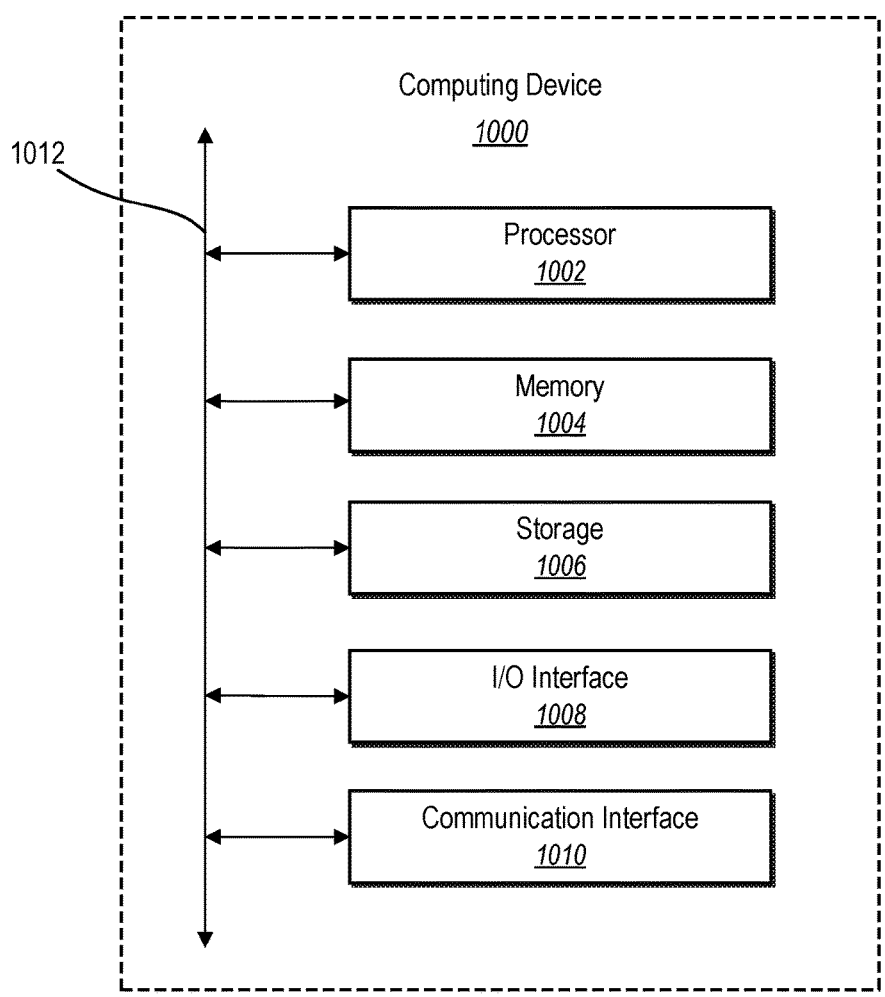
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital feature activation system 500 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method of securely and dynamically activating a plurality of features of the digital assets by encoding feature data in access tokens, comprising:

updating an original master feature registry listing features of a plurality of software products by adding an indication of a new feature corresponding to a software product providing, by one or more servers, the updated master feature registry to a client device comprising the software product by replacing a local original master feature registry stored on the client device with the updated master feature registry;

generating, by the one or more servers, a new feature set ID that indicates features of the software product that a user of the client device is permitted to access, the features of the software product that the user of the client device is permitted to access comprising the new feature corresponding to the software product;

embedding, by the one or more servers, the new feature set ID into an access token; and sending, by the one or more servers, the access token with the new feature set ID to the client device in response to authenticating the user such that the client device compares the updated master feature registry to the new feature set ID and, based on the comparison, activates the features of the software product that the user of the client device is permitted to access, including the new feature corresponding to the software product.

2. The method of claim 1, wherein generating the new feature set ID further comprises:

determining, from a user profile of the user, that the user is permitted to access the software product; and encoding a software product ID corresponding to the software product into the new feature set ID.

3. The method of claim 1, further comprising: authenticating the user based on a verification credential received from the client device.

4. The method of claim 1, further comprising:

receiving, from the client device, a second verification credential corresponding to a second user; and generating a second feature set ID based on the second user and a second software product associated with the second user.

5. The method of claim 4, further comprising:

embedding the second feature set ID corresponding to the second software product into a second access token; and sending the second access token with the embedded second feature set ID to the client device such that the client device compares the updated master feature registry to the second feature set ID, activates second features of the second software product based on the comparison of the updated master feature registry and the second feature set ID, and prohibits access to other features of the software product.

6. The method of claim 1, further comprising:

modifying the updated master file registry to list an additional feature of a new software product;

providing the modified master file registry to the client device; and generating an additional feature set ID based on the new software product.

7. The method of claim 6, further comprising:

embedding the additional feature set ID corresponding to the new software product into a second access token.

8. The method of claim 7, further comprising:

sending the second access token with the embedded additional feature set ID to the client device such that the client device can compare the modified master feature registry to the additional feature set ID embedded into the second access token and, based on the comparison of the modified master feature registry and the additional feature set ID, activate the additional feature of the new software product.

9. The method of claim 1, wherein embedding the new feature set ID into the access token further comprises: embedding an expiration time into the access token such that the client device will no longer activate the features of the software product utilizing the feature set ID after the expiration time.

10. A non-transitory computer readable medium storing instructions thereon that, when executed by at least one processor, cause a computer system to:

receive, from one or more servers at a client device, a master feature registry in conjunction with downloading a software product from the one or more servers, wherein the master feature registry lists a plurality of features of the software product;

in response to sending an authentication request to the one or more servers, receiving from the one or more servers an access token, wherein the access token comprises an embedded feature set ID corresponding to the software product;

store the embedded feature set ID in a memory at the client device;

compare the embedded feature set ID from the access token and the master feature registry received from the one or more servers to identify authorized features of the software product and activating activate the authorized features of the software product on the client device; and in response to detecting a user sign-out at the client device, deleting the embedded feature set ID from the memory at the client device such that the authorized features of the software product are no longer accessible.

11. The non-transitory computer readable medium of claim 10, further comprising instructions that, when executed by the at least one processor, cause the computer system to activate the authorized features without sending a request to a licensing server.

12. The non-transitory computer readable medium of claim 10, further comprising instructions that, when executed by the at least one processor, cause the computer system to:

receive an updated master feature registry in conjunction with downloading a new software product having a new feature; and in response to sending an additional authentication request to the one or more servers, receive from the one or more severs a second access token, wherein the second access token comprises an embedded second feature set ID corresponding to the new software product.

13. The non-transitory computer readable medium of claim 12, further comprising instructions that, when executed by the at least one processor, cause the computer system to:

compare the embedded second feature set ID corresponding to the new software product with the updated master feature registry received from the one or more servers to identify second authorized features, wherein the second authorized features comprise the new feature; and activate the second authorized features of the new software product on the client device.

14. The non-transitory computer readable medium of claim 10, further comprising instructions that, when executed by the at least one processor, cause the computer system to:

after deleting the embedded feature set ID from the memory at the client device, detect a second user signing into an account on the client device;

in response to the second user signing into the account on the client device, send verification credentials to the one or more servers; and in response to sending the verification credentials, receive a second access token, wherein the second access token comprises an embedded second feature set ID corresponding to a second software product; and store the embedded second feature set ID in the memory at the client device.

15. The non-transitory computer readable medium of claim 14, further comprising instructions that, when executed by the at least one processor, cause the computer system to:

compare the embedded second feature set ID from the second access token and the master feature registry received from the one or more servers to identify a second licensed feature set; and authorize the second licensed feature set in relation to the second software product.

16. The non-transitory computer readable medium of claim 10, further comprising instructions that, when executed by the at least one processor, cause the computer system to:

compare a checksum value of the master feature registry with a corresponding checksum value of the feature set ID; and activate the authorized features of the software product on the client device based on a determination that the checksum value of the master feature registry matches the corresponding checksum value of the feature set ID.

17. A system comprising:

at least one server; and at least one non-transitory computer readable storage medium storing instructions that, when executed by the at least one server cause the system to:

update a first master feature registry listing features of a plurality of software products by adding an indication of a new feature corresponding to a new software product;

provide the updated master feature registry to a client device of a user to replace the first master feature registry previously downloaded on the client device;

generate a new feature set ID that indicates the new software product that the user of the client device is permitted to access; and embed the new feature set ID corresponding to the new software product in an access token such that the client device, upon receiving the access token replaces an original feature set ID on the client device with the new feature set ID, and activates the new feature corresponding to the new software product by comparing the new feature set ID with the updated master feature registry on the client device.

18. The system of claim 17, further comprising instructions, that when executed by the at least one server, cause the system to: embed an expiration time into the access token such that the client device will no longer activate the new feature of the new software product utilizing the new feature set ID after the expiration time.

19. The system of claim 17, wherein generating the new feature set ID further comprises:

determining, from a user profile of the user, that the user is permitted to access the new software product; and encoding a software product ID corresponding to the new software product into the new feature set ID.

20. The system of claim 17, further comprising instructions, that when executed by the at least one server, cause the system to:

authenticate the user based on a verification credential received from the client device; and send the access token with the embedded new feature set ID to the client device in response to authenticating the user.

* * * * *